(12) United States Patent
Tada

(10) Patent No.: US 11,645,825 B2
(45) Date of Patent: May 9, 2023

(54) DETECTION DEVICE

(71) Applicant: Japan Display Inc., Tokyo (JP)

(72) Inventor: Masahiro Tada, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/831,128

(22) Filed: Jun. 2, 2022

(65) Prior Publication Data

US 2022/0392181 A1     Dec. 8, 2022

(30) Foreign Application Priority Data

Jun. 8, 2021    (JP) .............................. JP2021-096139

(51) Int. Cl.
| | |
|---|---|
| *G06V 10/141* | (2022.01) |
| *G06V 10/147* | (2022.01) |
| *G06V 10/74* | (2022.01) |
| *G06V 40/13* | (2022.01) |

(52) U.S. Cl.
CPC .......... *G06V 10/141* (2022.01); *G06V 10/147* (2022.01); *G06V 10/761* (2022.01); *G06V 40/1318* (2022.01)

(58) Field of Classification Search
CPC .. G06V 10/141; G06V 10/761; G06V 10/147; G06V 40/1318
See application file for complete search history.

(56) References Cited

U.S. PATENT DOCUMENTS

| | | | |
|---|---|---|---|
| 2009/0027328 A1 | 1/2009 | Hosono | |
| 2009/0027358 A1 | 1/2009 | Hosono | |
| 2015/0346897 A1* | 12/2015 | Irri | G06F 3/04186 345/175 |
| 2019/0034686 A1* | 1/2019 | Ling | G06K 9/00 |
| 2019/0347464 A1* | 11/2019 | Shen | G06V 10/141 |
| 2019/0392247 A1* | 12/2019 | Holz | H04N 13/254 |
| 2020/0267341 A1 | 8/2020 | Baba et al. | |

FOREIGN PATENT DOCUMENTS

| | | |
|---|---|---|
| JP | 2009-032005 A | 2/2009 |
| JP | 2017-118229 A | 6/2017 |

* cited by examiner

*Primary Examiner* — Lixi C Simpson
(74) *Attorney, Agent, or Firm* — K&L Gates LLP

(57) ABSTRACT

According to an aspect, a detection device includes: a substrate; a plurality of photodiodes arranged on the substrate; a light source configured to emit light to an object to be detected; a detection circuit configured to detect first detection signals based on reverse bias currents of the photodiodes when the light source is off, and to detect second detection signals based on the reverse bias currents of the photodiodes when the light source is on; and a memory configured to store first imaging data based on the first detection signals when the light source is off, second imaging data based on the second detection signals when the light source is on, and difference data between the first imaging data and the second imaging data.

8 Claims, 13 Drawing Sheets

DETECTION DEVICE

CROSS-REFERENCE TO RELATED APPLICATION

This application claims the benefit of priority from Japanese Patent Application No. 2021-096139 filed on Jun. 8, 2021, the entire contents of which are incorporated herein by reference.

BACKGROUND

1. Technical Field

What is disclosed herein relates to a detection device.

2. Description of the Related Art

Optical sensors capable of detecting fingerprint patterns and vascular patterns are known (for example, in Japanese Patent Application Laid-open Publication No. 2009-032005). Japanese Patent Application Laid-open Publication No. 2017-118229 describes a security technology that uses a physical unclonable function (PUF), such as a device-specific characteristic distribution, to identify individual sensor devices.

In a detection method of scanning a plurality of photodiodes to sequentially read output signals from the photodiodes, signals may be output that are obtained by adding the characteristic distribution of each of the photodiodes to information acquired from an object to be detected.

For the foregoing reasons, there is a need for a detection device capable of improving the detection accuracy.

SUMMARY

According to an aspect, a detection device includes: a substrate; a plurality of photodiodes arranged on the substrate; a light source configured to emit light to an object to be detected; a detection circuit configured to detect first detection signals based on reverse bias currents of the photodiodes when the light source is off, and to detect second detection signals based on the reverse bias currents of the photodiodes when the light source is on; and a memory configured to store first imaging data based on the first detection signals when the light source is off, second imaging data based on the second detection signals when the light source is on, and difference data between the first imaging data and the second imaging data.

According to an aspect, a detection device includes: a substrate; a plurality of photodiodes arranged on the substrate; a light source configured to emit light to an object to be detected; a detection circuit configured to detect first detection signals based on reverse bias currents of the photodiodes when the light source is off, detect second detection signals based on the reverse bias currents of the photodiodes when the light source is on, and detect third detection signals based on forward bias currents of the photodiodes when the light source is off; an individual device identification circuit configured to identify an individual device based on individual device imaging data based on the third detection signals; and a memory configured to store first biometric information imaging data based on the first detection signals when the light source is off, second biometric information imaging data based on the second detection signals when the light source is on, and difference data between the first biometric information imaging data and the second biometric information imaging data.

According to an aspect, a detection device includes: a substrate; a plurality of photodiodes arranged on the substrate; and a light source configured to emit light to an object to be detected. Imaging signals based on reverse bias currents of the photodiodes are detected when the light source is on. Identification signals based on forward bias currents of the photodiodes are detected when the light source is on or off. An individual device is identified based on the identification signals.

DETAILED DESCRIPTION

Figure 1:
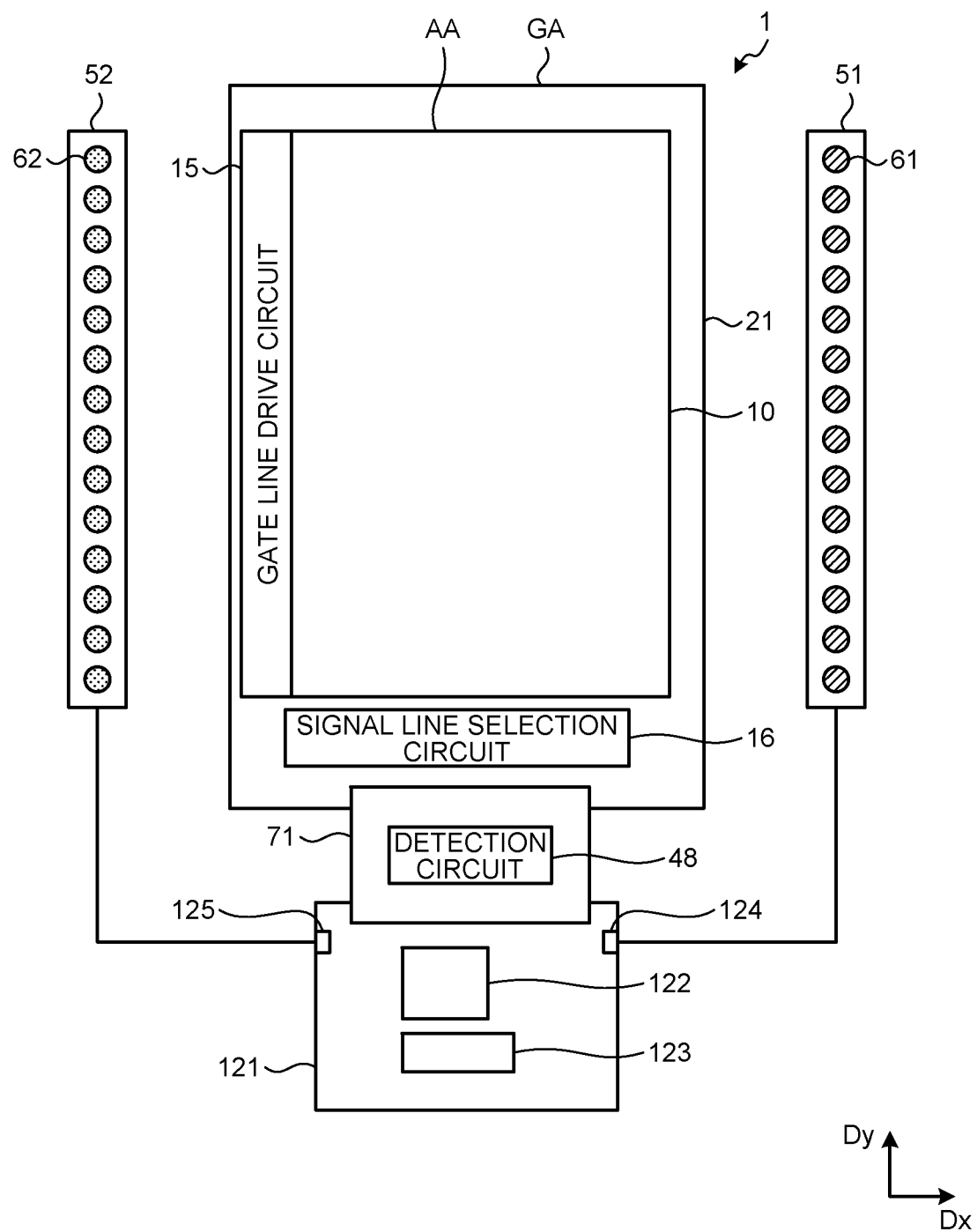
FIG. 1 is a plan view illustrating a detection device according to a first embodiment.

The following describes modes (embodiments) for carrying out the present disclosure in detail with reference to the drawings. The present disclosure is not limited to the description of the embodiments given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the disclosure. To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the description and the drawings, and detailed description thereof may not be repeated where appropriate.

In this disclosure, when an element is described as being "on" another element, the element can be directly on the other element, or there can be one or more elements between the element and the other element.

First Embodiment

FIG. 1 is a plan view illustrating a detection device according to a first embodiment. As illustrated in FIG. 1, a detection device 1 includes a sensor base member 21, a sensor 10, a gate line drive circuit 15, a signal line selection circuit 16, a detection circuit 48, a control circuit 122, a power supply circuit 123, a first light source base member 51, a second light source base member 52, first light sources 61, and second light sources 62. The first light source base member 51 is provided with the first light sources 61. The second light source base member 52 is provided with the second light sources 62.

The sensor base member 21 is electrically coupled to a control substrate 121 through a flexible printed circuit board 71. The flexible printed circuit board 71 is provided with the detection circuit 48. The control substrate 121 is provided with the control circuit 122 and the power supply circuit 123. The control circuit 122 is, for example, a field-programmable gate array (FPGA). The control circuit 122 supplies control signals to the sensor 10, the gate line drive circuit 15, and the signal line selection circuit 16 to control a detection operation of the sensor 10. The control circuit 122 supplies control signals to the first and the second light sources 61 and 62 to control lighting and non-lighting of the first and the second light sources 61 and 62. The power supply circuit 123 supplies voltage signals including, for example, a sensor power supply signal (sensor power supply voltage) VDDSNS (refer to FIG. 4) to the sensor 10, the gate line drive circuit 15, and the signal line selection circuit 16. The power supply circuit 123 supplies a power supply voltage to the first and the second light sources 61 and 62.

The sensor base member 21 has a detection area AA and a peripheral area GA. The detection area AA is an area provided with a plurality of photodiodes PD (refer to FIG. 4) included in the sensor 10. The peripheral area GA is an area between the outer perimeter of the detection area AA and ends of the sensor base member 21 and is an area not provided with the photodiodes PD.

The gate line drive circuit 15 and the signal line selection circuit 16 are provided in the peripheral area GA. Specifically, the gate line drive circuit 15 is provided in an area extending along a second direction Dy in the peripheral area GA. The signal line selection circuit 16 is provided in an area extending along a first direction Dx in the peripheral area GA, and is provided between the sensor 10 and the detection circuit 48.

The first direction Dx is one direction in a plane parallel to the sensor base member 21. The second direction Dy is one direction in the plane parallel to the sensor base member 21 and is a direction orthogonal to the first direction Dx. The second direction Dy may non-orthogonally intersect the first direction Dx. A third direction Dz is a direction orthogonal to the first direction Dx and the second direction Dy and is a direction normal to the sensor base member 21.

The first light sources 61 are provided on the first light source base member 51 and are arranged along the second direction Dy. The second light sources 62 are provided on the second light source base member 52 and are arranged along the second direction Dy. The first light source base member 51 and the second light source base member 52 are electrically coupled, through respective terminals 124 and 125 provided on the control substrate 121, to the control circuit 122 and the power supply circuit 123.

For example, inorganic light-emitting diodes (LEDs) or organic electroluminescence devices (organic light-emitting diodes: OLEDs) are used as the first and the second light sources 61 and 62. The first and the second light sources 61 and 62 emit first and second light, respectively, having different wavelengths.

The first light emitted from the first light sources 61 is mainly reflected on a surface of an object to be detected, such as a finger Fg, and is incident on the sensor 10. As a result, the sensor 10 can detect a fingerprint by detecting a shape of asperities on the surface of the finger Fg or the like. The second light emitted from the second light sources 62 is mainly reflected in the finger Fg or the like, or transmitted through the finger Fg or the like, and is incident on the sensor 10. As a result, the sensor 10 can detect information on a living body such as the finger Fg or the like. Examples of the information on the living body include a pulse wave, pulsation, and a vascular image of the finger Fg or a palm. That is, the detection device 1 may be configured as a fingerprint detection device to detect a fingerprint or a vein detection device to detect a vascular pattern of, for example, veins.

The first light may have a wavelength of from 500 nm to 600 nm, for example, a wavelength of approximately 550 nm, and the second light may have a wavelength of from 780 nm to 950 nm, for example, a wavelength of approximately 850 nm. In this case, the first light is blue or green visible light, and the second light is infrared light. The sensor 10 can detect a fingerprint based on the first light emitted from the first light sources 61. The second light emitted from the second light sources 62 is reflected in the object to be detected such as a finger Fg, or transmitted through or absorbed by the finger Fg or the like, and is incident on the sensor 10. As a result, the sensor 10 can detect the pulse wave or the vascular image (vascular pattern) as the information on the living body in the finger Fg or the like.

Alternatively, the first light may have a wavelength of from 600 nm to 700 nm, for example, approximately 660 nm, and the second light may have a wavelength of from 780 nm to 900 nm, for example, approximately 850 nm. In this case, the sensor 10 can detect a blood oxygen saturation level in addition to the pulse wave, the pulsation, and the vascular image as the information on the living body based on the first light emitted from the first light sources 61 and the second light emitted from the second light sources 62. Thus, the detection device 1 includes the first and the second light sources 61 and 62, and therefore, can detect the various information on the living body by performing the detection based on the first light and the detection based on the second light.

The arrangement of the first and the second light sources 61 and 62 illustrated in FIG. 1 is merely an example, and may be changed as appropriate. The detection device 1 is provided with a plurality of types of light sources (first and second light sources 61 and 62) as the light sources. However, the light sources are not limited thereto, and may be of one type. For example, the first and the second light sources 61 and 62 may be arranged on each of the first and the second light source base members 51 and 52. The first and the second light sources 61 and 62 may be provided on one or three or more light source base members. At least one light source needs to be disposed.

Figure 2:
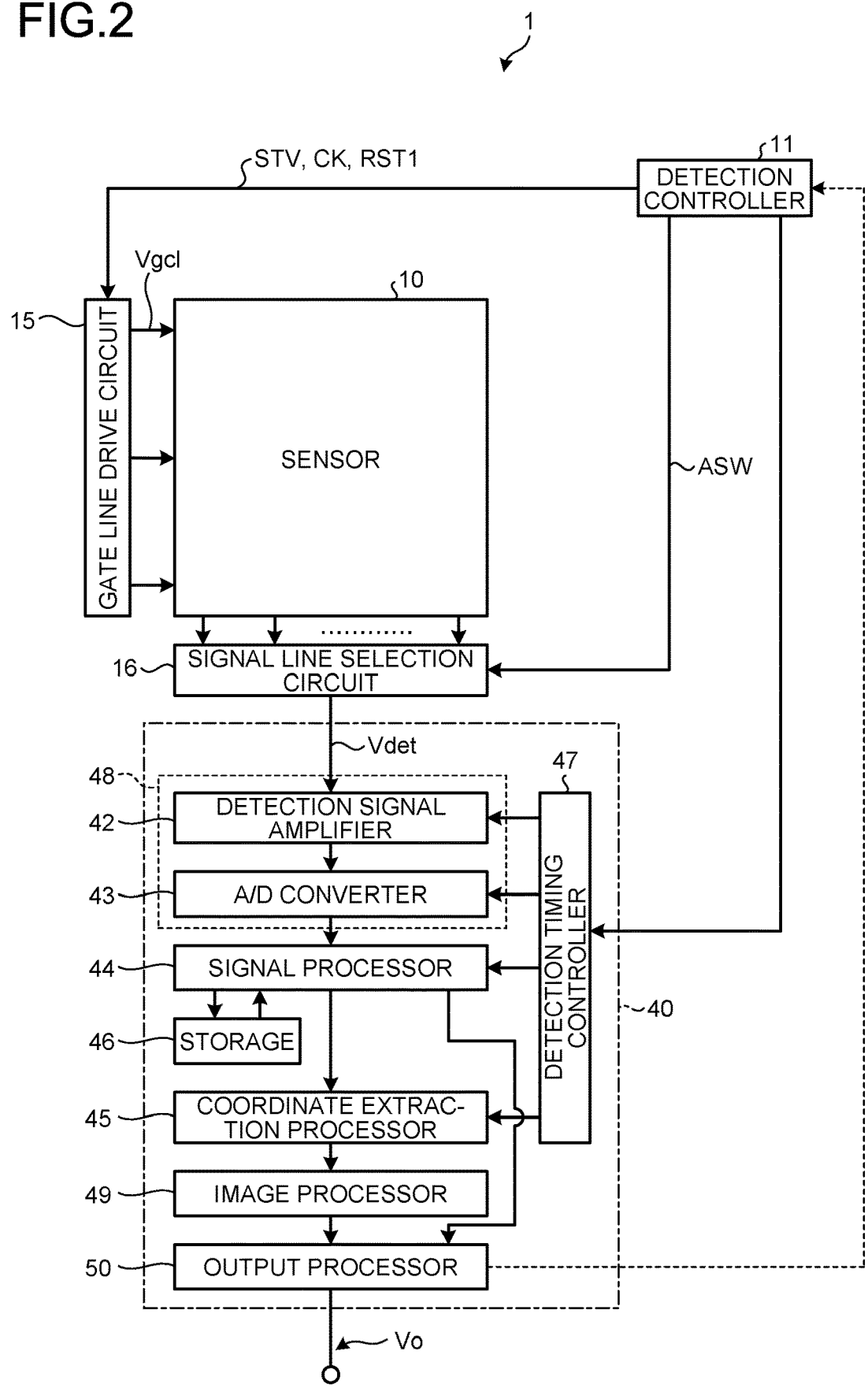
FIG. 2 is a block diagram illustrating a configuration example of the detection device according to the first embodiment.

FIG. 2 is a block diagram illustrating a configuration example of the detection device according to the first embodiment. As illustrated in FIG. 2, the detection device 1 further includes a detection controller 11 and a detector (detection signal processing circuit) 40. The control circuit 122 includes one, some, or all functions of the detection controller 11. The control circuit 122 also includes one, some, or all functions of the detector 40 except those of the detection circuit 48.

The sensor 10 includes the photodiodes PD. Each of the photodiodes PD included in the sensor 10 is an optical sensor that outputs an electric signal corresponding to light irradiating the photodiode PD as a detection signal Vdet to the signal line selection circuit 16. The sensor 10 performs the detection according to a gate drive signal Vgcl supplied from the gate line drive circuit 15.

The detection controller 11 is a circuit that supplies respective control signals to the gate line drive circuit 15, the signal line selection circuit 16, and the detector 40 to control operations thereof. The detection controller 11 supplies various control signals such as a start signal STV, a clock signal CK, and a reset signal RST1 to the gate line drive circuit 15. The detection controller 11 also supplies various control signals such as a selection signal ASW to the signal line selection circuit 16. The detection controller 11 supplies various control signals to the first and the second light sources 61 and 62 to control the lighting and non-lighting of the respective first and second light sources 61 and 62.

The gate line drive circuit 15 is a circuit that drives a plurality of gate lines GCL (refer to FIG. 3) based on the various control signals. The gate line drive circuit 15 sequentially or simultaneously selects the gate lines GCL, and supplies the gate drive signals Vgcl to the selected gate lines GCL. By this operation, the gate line drive circuit 15 selects the photodiodes PD coupled to the gate lines GCL.

Figure 3:
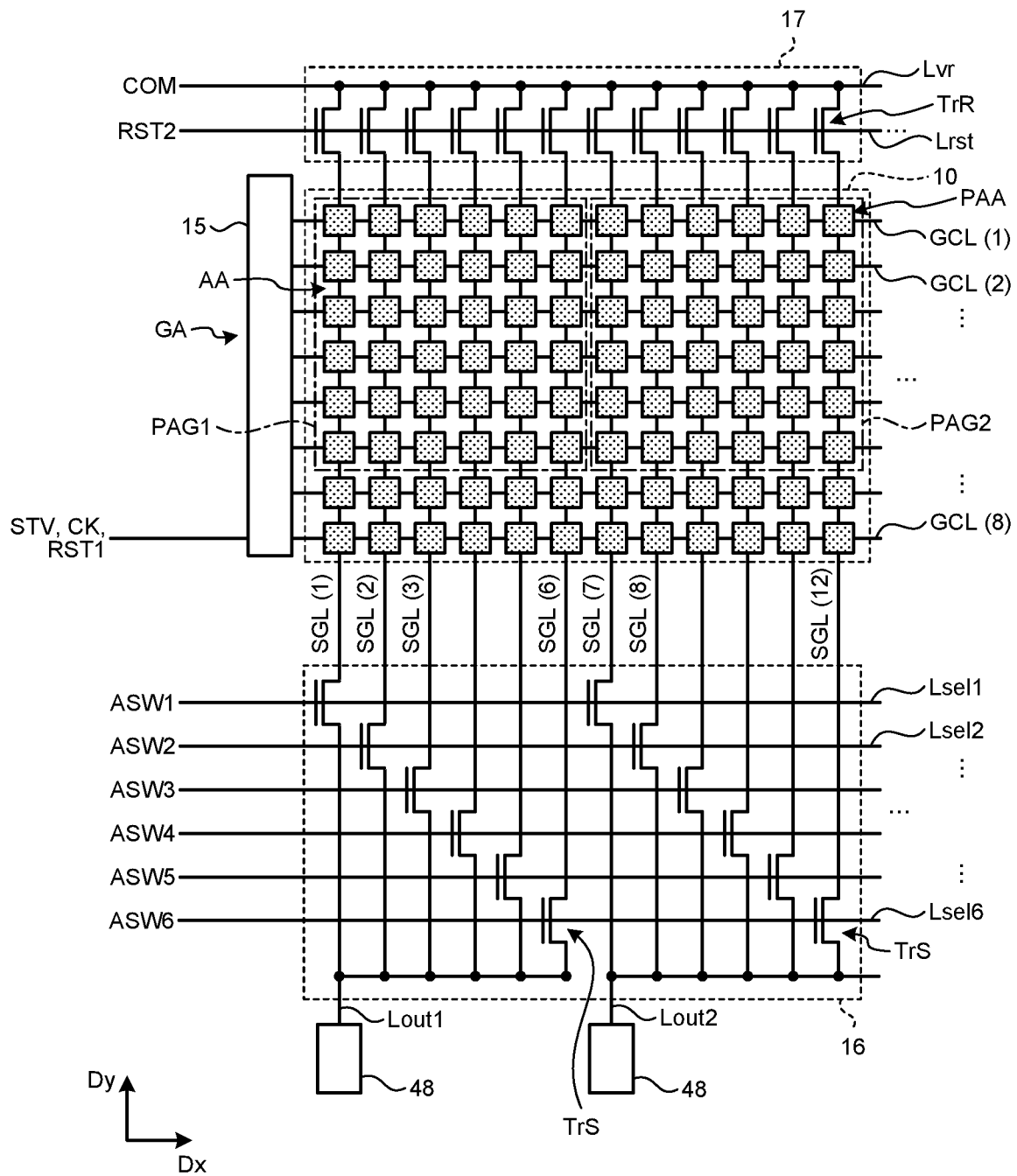
FIG. 3 is a circuit diagram illustrating the detection device.

The signal line selection circuit 16 is a switching circuit that sequentially or simultaneously selects a plurality of signal lines SGL (refer to FIG. 3). The signal line selection circuit 16 is, for example, a multiplexer. The signal line selection circuit 16 couples the selected signal lines SGL to the detection circuit 48 based on the selection signal ASW supplied from the detection controller 11. By this operation, the signal line selection circuit 16 outputs the detection signals Vdet of the photodiodes PD to the detector 40.

The detector 40 includes the detection circuit 48, a signal processor (signal processing circuit) 44, a coordinate extraction processor (coordinate extraction circuit) 45, a storage (storage circuit) 46, a detection timing controller (detection timing control circuit) 47, an image processor (image processing circuit) 49, and an output processor (output processing circuit) 50. Based on a control signal supplied from the detection controller 11, the detection timing controller 47 controls the detection circuit 48, the signal processor 44, the coordinate extraction processor 45, and the image processor 49 so as to operate in synchronization with one another.

The detection circuit 48 is, for example, an analog front-end (AFE) circuit. The detection circuit 48 is a signal processing circuit having functions of at least a detection signal amplifier 42 and an analog-to-digital (A/D) converter 43. The detection signal amplifier 42 amplifies the detection signals Vdet. The A/D converter 43 converts analog signals output from the detection signal amplifier 42 into digital signals.

The signal processor 44 is a logic circuit that detects a predetermined physical quantity received by the sensor 10 based on an output signal of the detection circuit 48. The signal processor 44 can detect the asperities on the surface of the finger Fg or the palm based on the signals from the detection circuit 48 when the finger Fg is in contact with or in proximity to a detection surface. The signal processor 44 can also detect the information on the living body based on the signal from the detection circuit 48. Examples of the information on the living body include the vascular image, the pulse wave, the pulsation, and the blood oxygen level of the finger Fg or the palm.

The signal processor 44 may also perform processing of acquiring the detection signals Vdet (information on the living body) simultaneously detected by the photodiodes PD, and averaging the detection signals Vdet. In this case, the detector 40 can perform stable detection by reducing measurement errors caused by noise or relative positional misalignment between the object to be detected, such as a finger Fg, and the sensor 10.

The storage 46 temporarily stores therein a signal calculated by the signal processor 44. The storage 46 may be, for example, a random-access memory (RAM) or a register circuit.

The coordinate extraction processor 45 is a logic circuit that obtains detected coordinates of the asperities on the surface of the finger or the like when the contact or the proximity of the finger is detected by the signal processor 44. The coordinate extraction processor 45 is also a logic circuit that obtains detected coordinates of blood vessels of the finger Fg or the palm. The image processor 49 combines the detection signals Vdet output from the respective photodiodes PD of the sensor 10 to generate two-dimensional information indicating the shape of the asperities on the surface of the finger Fg or the like and two-dimensional information indicating the shape of the blood vessels of the finger Fg or the palm. The coordinate extraction processor 45 may output the detection signals Vdet as sensor output voltages Vo instead of calculating the detected coordinates. A case can be considered where the detector 40 does not include the coordinate extraction processor 45 and the image processor 49.

The output processor 50 serves as a processor that performs processing based on the outputs from the photodiodes PD. Specifically, the output processor 50 of the present embodiment outputs the sensor output voltages Vo including at least pulse wave data based on at least the detection signals Vdet acquired by the signal processor 44. In the present embodiment, the signal processor 44 outputs data indicating a variation (amplitude) in output of the detection signal Vdet of each of the photodiodes PD (described later), and the output processor 50 determines which outputs are to be employed as the sensor output voltages Vo. However, the signal processor 44 or the output processor 50 may perform both the above-described operations. The output processor 50 may include, for example, the detected coordinates obtained by the coordinate extraction processor 45 and the two-dimensional information generated by the image processor 49 in the sensor output voltages Vo. The function of the output processor 50 may be integrated into another component (such as the image processor 49).

The following describes a circuit configuration example of the detection device 1. FIG. 3 is a circuit diagram illustrating the detection device. As illustrated in FIG. 3, the sensor 10 has a plurality of partial detection areas PAA arranged in a matrix having a row-column configuration. Each of the partial detection areas PAA is provided with the photodiode PD.

The gate lines GCL extend in the first direction Dx, and are coupled to the partial detection areas PAA arranged in the first direction Dx. A plurality of gate lines GCL(1), GCL(2), ..., GCL(8) are arranged in the second direction Dy, and are each coupled to the gate line drive circuit 15. In the following description, the gate lines GCL(1), GCL(2), ..., GCL(8) will each be simply referred to as the gate line GCL when they need not be distinguished from one another. For ease of understanding of the description, FIG. 3 illustrates eight gate lines GCL. However, this is merely an example, and M gate lines GCL (where M is eight or larger, and is, for example, 256) may be arranged.

The signal lines SGL extend in the second direction Dy, and are coupled to the photodiodes PD of the partial detection areas PAA arranged in the second direction Dy. A plurality of signal lines SGL(1), SGL(2), ..., SGL(12) are arranged in the first direction Dx, and are each coupled to the signal line selection circuit 16 and a reset circuit 17. In the following description, the signal lines SGL(1), SGL(2), ..., SGL(12) will each be simply referred to as the signal line SGL when they need not be distinguished from one another.

For ease of understanding of the description, 12 signal lines SGL are illustrated. However, this is merely an example, and N signal lines SGL (where N is 12 or larger and is, for example, 252) may be arranged. In FIG. 3, the sensor 10 is provided between the signal line selection circuit 16 and the reset circuit 17. The present disclosure is not limited thereto. The signal line selection circuit 16 and the reset circuit 17 may be coupled to ends in the same direction of the signal lines SGL. The substantial area of one sensing region is, for example, substantially 50×50 µm². The resolution of the detection area AA is, for example, substantially 508 pixels per inch (ppi). The number of the sensing regions arranged in the detection area AA is, for example, 252 cells×256 cells. The area of the detection area AA is, for example, 12.6×12.8 mm².

The gate line drive circuit 15 receives the various control signals such as the start signal STV, the clock signal CK, and the reset signal RST1 from the control circuit 122 (refer to FIG. 1). The gate line drive circuit 15 sequentially selects the gate lines GCL(1), GCL(2), ..., GCL(8) in a time-division manner based on the various control signals. The gate line drive circuit 15 supplies the gate drive signal Vgcl to the selected one of the gate lines GCL. This operation supplies the gate drive signal Vgcl to a plurality of first switching elements Tr coupled to the gate line GCL, and corresponding ones of the partial detection areas PAA arranged in the first direction Dx are selected as detection targets.

The gate line drive circuit 15 may perform different driving for each of detection modes including the detection of a fingerprint and the detection of different items of the information on the living body (such as the pulse wave, the pulsation, the blood vessel image, and the blood oxygen level). For example, the gate line drive circuit 15 may drive more than one of the gate lines GCL collectively.

The signal line selection circuit 16 includes a plurality of selection signal lines Lsel, a plurality of output signal lines Lout, and third switching elements TrS. The third switching elements TrS are provided corresponding to the signal lines SGL. Six signal lines SGL(1), SGL(2), ..., SGL(6) are coupled to a common output signal line Lout1. Six signal lines SGL(7), SGL(8), ..., SGL(12) are coupled to a common output signal line Lout2. The output signal lines Lout1 and Lout2 are each coupled to the detection circuit 48.

The signal lines SGL(1), SGL(2), ..., SGL(6) are grouped into a first signal line block, and the signal lines SGL(7), SGL(8), ..., SGL(12) are grouped into a second signal line block. The selection signal lines Lsel are coupled to the gates of the respective third switching elements TrS included in one of the signal line blocks. One of the selection signal lines Lsel is coupled to the gates of the third switching elements TrS in the signal line blocks.

The control circuit 122 (refer to FIG. 1) sequentially supplies the selection signal ASW to the selection signal lines Lsel. Through the operations of the third switching elements TrS, the signal line selection circuit 16 sequentially selects the signal lines SGL in one of the signal line blocks in a time-division manner. The signal line selection circuit 16 selects one of the signal lines SGL in each of the signal line blocks. With the above-described configuration, the detection device 1 can reduce the number of integrated circuits (ICs) including the detection circuit 48 or the number of terminals of the ICs. The signal line selection circuit 16 may couple more than one of the signal lines SGL collectively to the detection circuit 48.

As illustrated in FIG. 3, the reset circuit 17 includes a reference signal line Lvr, a reset signal line Lrst, and fourth switching elements TrR. The fourth switching elements TrR are provided correspondingly to the signal lines SGL. The reference signal line Lvr is coupled to either the sources or the drains of the fourth switching elements TrR. The reset signal line Lrst is coupled to the gates of the fourth switching elements TrR.

The control circuit 122 supplies a reset signal RST2 to the reset signal line Lrst. This operation turns on the fourth switching elements TrR to electrically couple the signal lines SGL to the reference signal line Lvr. The power supply circuit 123 supplies a reference signal COM to the reference signal line Lvr. This operation supplies the reference signal COM to a capacitive element Ca (refer to FIG. 4) included in each of the partial detection areas PAA.

Figure 4:
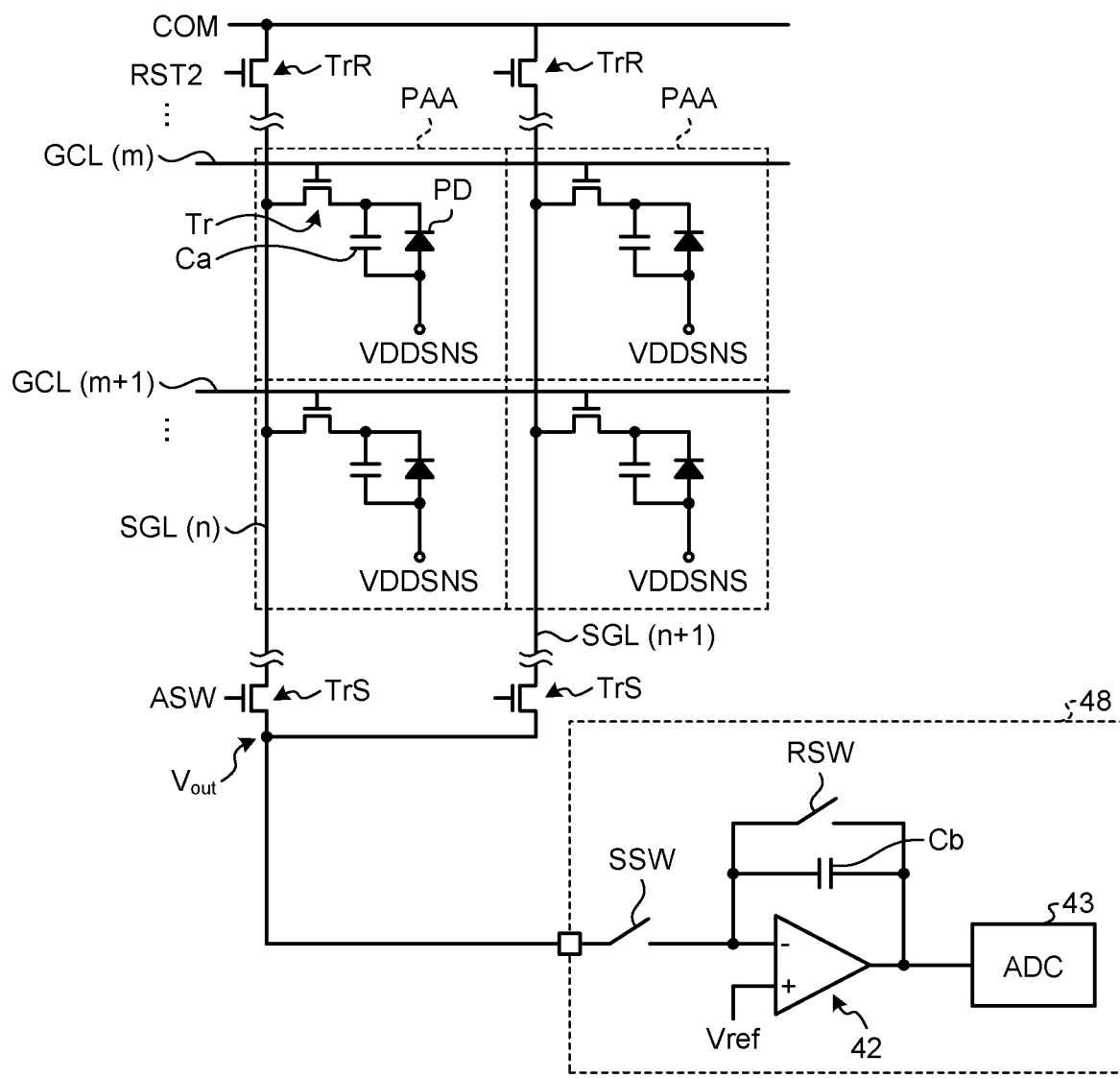
FIG. 4 is a circuit diagram illustrating a plurality of partial detection areas.

FIG. 4 is a circuit diagram illustrating the partial detection areas. FIG. 4 also illustrates a circuit configuration of the detection circuit 48. As illustrated in FIG. 4, each of the partial detection areas PAA includes the photodiode PD, the capacitive element Ca, and a corresponding one of the first switching elements Tr. The capacitive element Ca is capacitance (sensor capacitance) generated in the photodiode PD, and is equivalently coupled in parallel with the photodiode PD.

FIG. 4 illustrates two gate lines GCL(m) and GCL(m+1) arranged in the second direction Dy among the gate lines GCL. FIG. 4 also illustrates two signal lines SGL(n) and SGL(n+1) arranged in the first direction Dx among the signal lines SGL. The partial detection area PAA is an area surrounded by the gate lines GCL and the signal lines SGL.

Each of the first switching elements Tr is provided correspondingly to the photodiode PD. The first switching element Tr includes a thin-film transistor, and in this example, includes an n-channel metal oxide semiconductor (MOS) thin-film transistor (TFT).

The gates of the first switching elements Tr belonging to the partial detection areas PAA arranged in the first direction Dx are coupled to the gate line GCL. The sources of the first switching elements Tr belonging to the partial detection areas PAA arranged in the second direction Dy are coupled to the signal line SGL. The drain of the first switching element Tr is coupled to the cathode of the photodiode PD and the capacitive element Ca.

The anode of the photodiode PD is supplied with the sensor power supply signal VDDSNS from the power supply circuit 123. The signal line SGL and the capacitive element Ca are supplied with the reference signal COM that serves as an initial potential of the signal line SGL and the capacitive element Ca from the power supply circuit 123.

When the partial detection area PAA is irradiated with light, a current corresponding to the amount of the light flows through the photodiode PD. As a result, an electric charge is stored in the capacitive element Ca. After the first switching element Tr is turned on, a current corresponding to the electric charge stored in the capacitive element Ca flows through the signal line SGL. The signal line SGL is coupled to the detection circuit 48 through a corresponding one of the third switching elements TrS of the signal line selection circuit 16. Thus, the detection device 1 can detect a signal corresponding to the amount of the light irradiating the photodiode PD in each of the partial detection areas PAA or each block unit PAG.

During a reading period Pdet (refer to FIG. 7), a switch SSW of the detection circuit 48 is turned on, and the detection circuit 48 is coupled to the signal lines SGL. The detection signal amplifier 42 of the detection circuit 48 converts a variation of a current supplied from the signal lines SGL into a variation of a voltage, and amplifies the result. A reference potential (Vref) having a fixed potential is supplied to a non-inverting input portion (+) of the detection signal amplifier 42, and the signal lines SGL are coupled to an inverting input terminal (−) of the detection signal amplifier 42. In the present embodiment, the same signal as the reference signal COM is supplied as the reference potential (Vref). The detection signal amplifier 42 includes a capacitive element Cb and a reset switch RSW. During a reset period Prst (refer to FIG. 7), the reset switch RSW is turned on, and an electric charge of the capacitive element Cb is reset.

Figure 5:
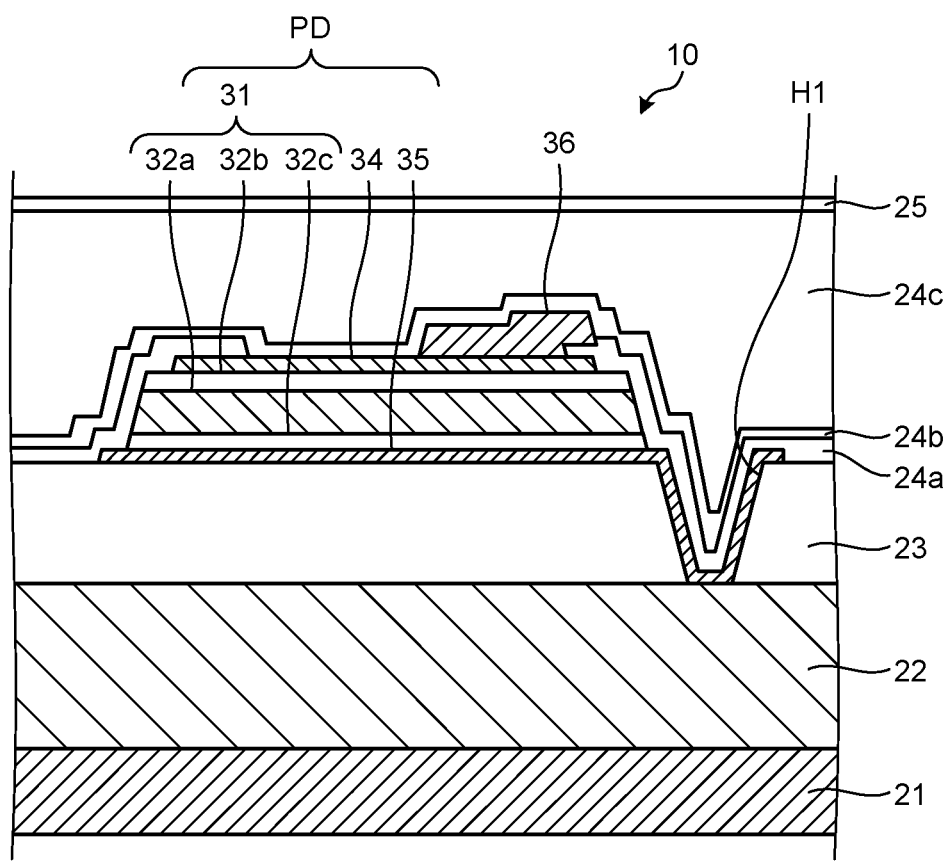
FIG. 5 is a sectional view illustrating a schematic sectional configuration of a sensor.

The following describes a configuration of a photodiode PD. FIG. 5 is a sectional view illustrating a schematic sectional configuration of the sensor. As illustrated in FIG. 5, the sensor 10 includes the sensor base member 21, a TFT layer 22, an insulating layer 23, the photodiode PD, and insulating layers 24a, 24b, 24c, and 25. The sensor base member 21 is an insulating base member, and is made using, for example, glass or a resin material. The sensor base member 21 is not limited to having a flat plate shape, and may have a curved surface. In this case, the sensor base member 21 can be a film-like resin. The sensor base member 21 has a first surface and a second surface on the opposite side to the first surface. The TFT layer 22, the insulating layer 23, the photodiode PD, and the insulating layers 24a, 24b, 24c, and 25 are stacked in this order on the first surface.

The TFT layer 22 is provided with circuits such as the gate line drive circuit 15 and the signal line selection circuit 16 described above. The TFT layer 22 is also provided with TFTs, such as the first switching elements Tr, and various types of wiring such as the gate lines GCL and signal lines SGL. The sensor base member 21 and the TFT layer 22 are a drive circuit board that drives the sensing region for each predetermined detection area and are also called a backplane or an array substrate.

The insulating layer 23 is an organic insulating layer and is provided on the TFT layer 22. The insulating layer 23 is a planarizing layer that planarizes asperities formed by the first switching elements Tr formed in the TFT layer 22 and by various conductive layers.

The photodiode PD is provided on the insulating layer 23. The photodiode PD includes a lower electrode 35, a semiconductor layer 31, and an upper electrode 34, which are stacked in this order.

The lower electrode 35 is provided on the insulating layer 23, and is electrically coupled to the first switching element Tr in the TFT layer 22 through a contact hole H1. The lower electrode 35 is the cathode of the photodiode PD and is an electrode for reading the detection signal Vdet. The lower electrode 35 is formed of, for example, a light-transmitting conductive material such as indium tin oxide (ITO).

The semiconductor layer 31 is formed of amorphous silicon (a-Si). The semiconductor layer 31 includes an i-type semiconductor layer 32a, a p-type semiconductor layer 32b, and an n-type semiconductor layer 32c. The i-type semiconductor layer 32a, the p-type semiconductor layer 32b, and the n-type semiconductor layer 32c constitute a specific example of a photoelectric conversion element. In FIG. 5, the n-type semiconductor layer 32c, the i-type semiconductor layer 32a, and the p-type semiconductor layer 32b are stacked in this order in a direction orthogonal to a surface of the sensor base member 21. However, the semiconductor layer 31 may have a reversed configuration, that is, the p-type semiconductor layer 32b, the i-type semiconductor layer 32a, and the n-type semiconductor layer 32c may be stacked in this order. The semiconductor layer 31 may be a photoelectric conversion element formed of organic semiconductors.

The a-Si of the n-type semiconductor layer 32c is doped with impurities to form an n+ region. The a-Si of the p-type semiconductor layer 32b is doped with impurities to form a p+ region. The i-type semiconductor layer 32a is, for example, a non-doped intrinsic semiconductor, and has lower conductivity than that of the p-type semiconductor layer 32b and the n-type semiconductor layer 32c.

The upper electrode 34 is the anode of the photodiode PD and is an electrode for supplying the power supply signal VDDSNS to a photoelectric conversion layer. The upper electrode 34 is a light-transmitting conductive layer of, for example, ITO, and a plurality of the upper electrodes 34 are provided for each of the photodiodes PD.

The insulating layers 24a and 24b are provided on the insulating layer 23. The insulating layer 24a covers the periphery of the upper electrode 34 and is provided with an opening in a position overlapping the upper electrode 34. Coupling wiring 36 is coupled to the upper electrode 34 at a portion of the upper electrode 34 not provided with the insulating layer 24a. The insulating layer 24b is provided on the insulating layer 24a so as to cover the upper electrode 34 and the coupling wiring 36. The insulating layer 24c serving as a planarizing layer is provided on the insulating layer 24b. The insulating layer 25 is provided on the insulating layer 24c. However, the insulating layer 25 need not be provided.

Figure 6:
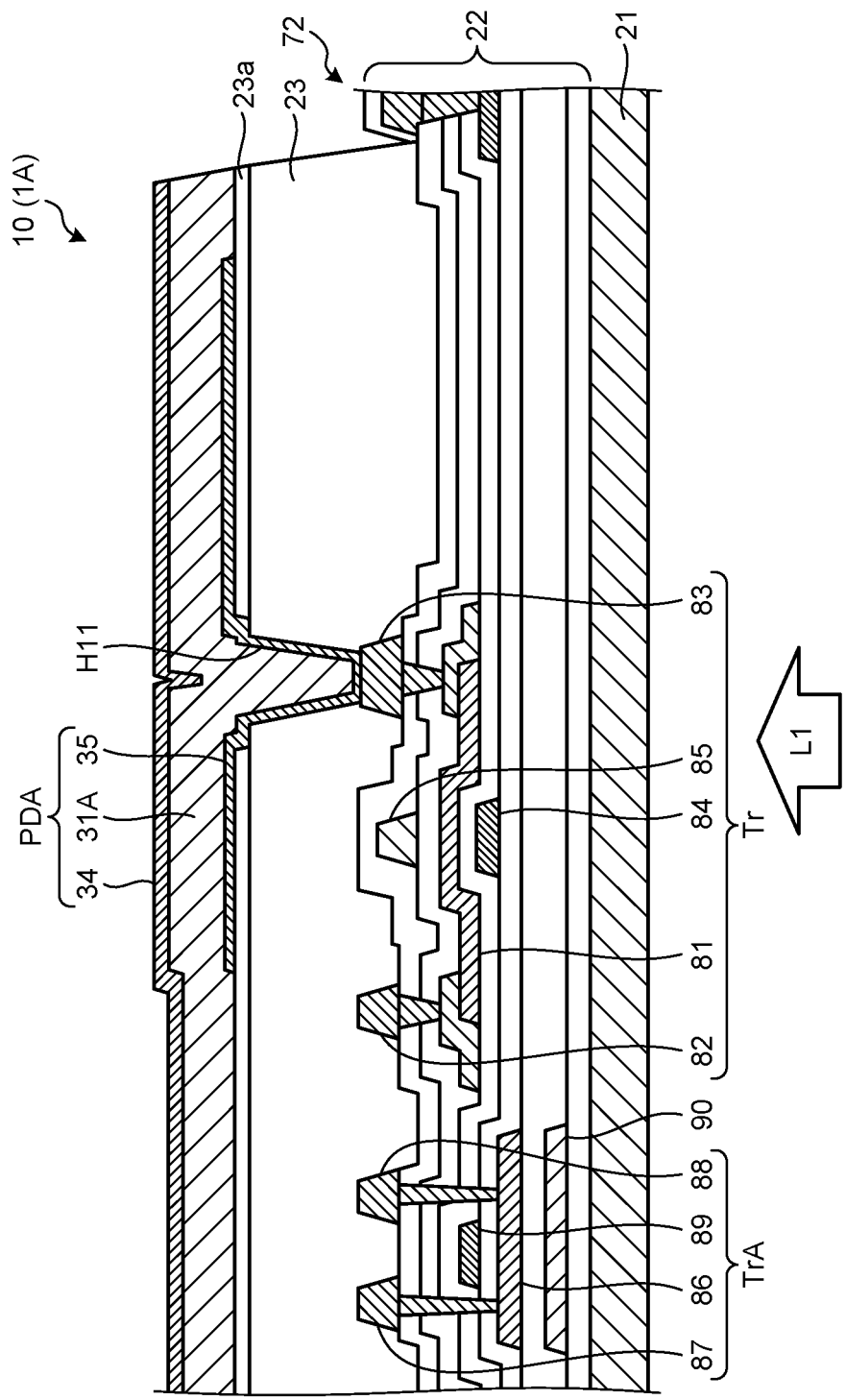
FIG. 6 is a sectional view illustrating a schematic sectional configuration of the sensor of a detection device according to a first modification.

FIG. 6 is a sectional view illustrating a schematic sectional configuration of the sensor of a detection device according to a first modification. As illustrated in FIG. 6, in a detection device 1A of the first modification, a photodiode PDA is provided above an insulating layer 23a. The insulating layer 23a is an inorganic insulating layer provided so as to cover the insulating layer 23, and is formed of, for example, silicon nitride (SiN). The photodiode PDA includes a photoelectric conversion layer 31A, the lower electrode 35 (cathode electrode), and the upper electrode 34 (anode electrode). The lower electrode 35, the photoelectric conversion layer 31A, and the upper electrode 34 are stacked in this order in a direction orthogonal to the first surface of the sensor base member 21.

The photoelectric conversion layer 31A changes in characteristics (for example, voltage-current characteristics and a resistance value) depending on light emitted thereto. An organic material is used as a material of the photoelectric conversion layer 31A. Specifically, as the photoelectric conversion layer 31A, low-molecular-weight organic materials can be used including, for example, fullerene ($C_{60}$), phenyl-$C_{61}$-butyric acid methyl ester (PCBM), copper phthalocyanine (CuPc), fluorinated copper phthalocyanine ($F_{16}$CuPc), rubrene (5,6,11,12-tetraphenyltetracene), and PDI (a derivative of perylene).

The photoelectric conversion layer 31A can be formed by a vapor deposition process (dry process) using the above-listed low-molecular-weight organic materials. In this case, the photoelectric conversion layer 31A may be, for example, a multilayered film of CuPc and $F_{16}$CuPc, or a multilayered film of rubrene and $C_{60}$. The photoelectric conversion layer 31A can also be formed by a coating process (wet process). In this case, the photoelectric conversion layer 31A is made using a material obtained by combining the above-listed low-molecular-weight organic materials with high-molecular-weight organic materials. As the high-molecular-weight organic materials, for example, poly(3-hexylthiophene) (P3HT) and F8-alt-benzothiadiazole (F8BT) can be used. The photoelectric conversion layer 31A can be a film in the state of a mixture of P3HT and PCBM or a film in the state of a mixture of F8BT and PDI.

The lower electrode 35 faces the upper electrode 34 with the photoelectric conversion layer 31A interposed therebetween. The upper electrode 34 is formed of, for example, a light-transmitting conductive material such as ITO. For example, a metal material such as silver (Ag) or aluminum (Al) is used as the lower electrode 35. Alternatively, the lower electrode 35 may be made of an alloy material containing at least one or more of these metal materials.

The lower electrode 35 can be formed as a light-transmitting transflective electrode by controlling the film thickness of the lower electrode 35. For example, the lower electrode 35 is formed of a thin Ag film having a thickness of 10 nm so as to have light transmittance of approximately 60%. In this case, the photodiode PDA can detect light emitted from both sides of the sensor base member 21, for example, both light L1 emitted from the second surface side and light emitted from the first surface side.

Although not illustrated in FIG. 6, a protective film may be provided so as to cover the upper electrode 34. The protective film is a passivation film and is provided to protect the photodiode PDA.

As illustrated in FIG. 6, the TFT layer 22 is provided with the first switching element Tr electrically coupled to the photodiode PDA. The first switching element Tr includes a semiconductor layer 81, a source electrode 82, a drain electrode 83, and gate electrodes 84 and 85. The lower electrode 35 of the photodiode PDA is electrically coupled to the drain electrode 83 of the first switching element Tr through a contact hole H11 provided in the insulating layers 23 and 23a.

The first switching element Tr has what is called a dual-gate structure provided with the gate electrodes 84 and 85 on the upper and lower sides of the semiconductor layer 81. However, the first switching element Tr is not limited to this structure and may have a top-gate structure or a bottom-gate structure.

FIG. 6 schematically illustrates a second switching element TrA and a terminal 72 provided in the peripheral area GA. The second switching element TrA is, for example, a switching element provided in the gate line drive circuit 15 (refer to FIG. 1). The second switching element TrA includes a semiconductor layer 86, a source electrode 87, a drain electrode 88, and a gate electrode 89. The second switching element TrA has what is called a top-gate structure provided with the gate electrode 89 on the upper side of the semiconductor layer 86. A light-blocking layer 90 is provided between the semiconductor layer 86 and the sensor base member 21 on the lower side of the semiconductor layer 86. The second switching element TrA is, however, not limited to the above-described structure and may have a bottom-gate structure or a dual-gate structure.

The semiconductor layer 81 of the first switching element Tr is provided in a layer different from that of the semiconductor layer 86 of the second switching element TrA. The semiconductor layer 81 of the first switching element Tr is formed of, for example, an oxide semiconductor. The semiconductor layer 86 of the second switching element TrA is formed of, for example, polysilicon.

Figure 7:
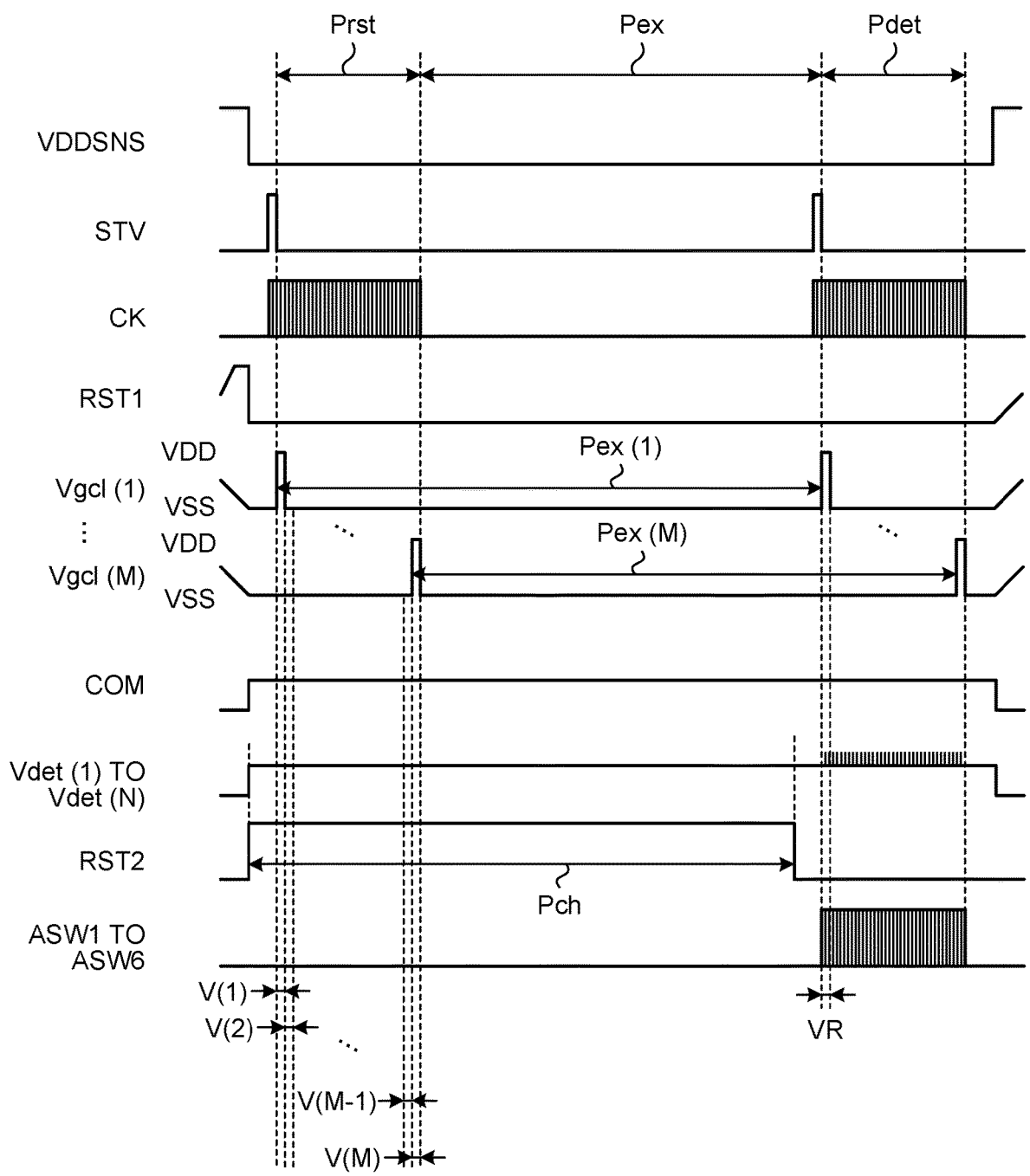
FIG. 7 is a timing waveform diagram illustrating an operation example of the detection device.

The following describes an operation example of the detection device 1 of the present embodiment. FIG. 7 is a timing waveform diagram illustrating the operation example of the detection device. As illustrated in FIG. 7, the detection device 1 has the reset period Prst, an exposure period Pex, and the reading period Pdet. The power supply circuit 123 supplies the sensor power supply signal VDDSNS to the anode of the photodiode PD over the reset period Prst, the exposure period Pex, and the reading period Pdet. The sensor power supply signal VDDSNS is a signal for applying a reverse bias between the anode and the cathode of the photodiode PD. For example, the reference signal COM at substantially 0.75 V is applied to the cathode of the photodiode PD, and the sensor power supply signal VDDSNS at substantially −1.25 V is applied to the anode of the photodiode PD. As a result, a reverse bias at substantially 2.0 V is applied between the anode and the cathode. The control circuit 122 sets the reset signal RST2 to "H", and then, supplies the start signal STV and the clock signal CK to the gate line drive circuit 15 to start the reset period Prst. During the reset period Prst, the control circuit 122 supplies the reference signal COM to the reset circuit 17, and uses the reset signal RST2 to turn on each of the fourth switching elements TrR for supplying a reset voltage. This operation supplies the reference signal COM as the reset voltage to each of the signal lines SGL. The reference signal COM is set to, for example, 0.75 V.

During the reset period Prst, the gate line drive circuit 15 sequentially selects each of the gate lines GCL based on the start signal STV, the clock signal CK, and the reset signal RST1. The gate line drive circuit 15 sequentially supplies the gate drive signals Vgcl {Vgcl(1), . . . , Vgcl(M)} to the gate lines GCL. The gate drive signal Vgcl has a pulsed waveform having a power supply voltage VDD serving as a high-level voltage and a power supply voltage VSS serving as a low-level voltage. In FIG. 7, M gate lines GCL (where M is, for example, 256) are provided, and the gate drive signals Vgcl(1), . . . , Vgcl(M) are sequentially supplied to the respective gate lines GCL. Thus, the first switching elements Tr are sequentially brought into a conducting state and supplied with the reset voltage on a row-by-row basis. For example, a voltage 0.75 V of the reference signal COM is supplied as the reset voltage.

Thus, during the reset period Prst, the capacitive elements Ca of all the partial detection areas PAA are sequentially electrically coupled to the signal lines SGL, and are supplied with the reference signal COM. As a result, the capacitance of the capacitive elements Ca is reset. The capacitance of the capacitive elements Ca of some of the partial detection areas PAA can be reset by partially selecting the gate lines and the signal lines SGL.

Examples of the exposure timing control method include a control method of exposure during non-selection of gate lines and a full-time control method of exposure. In the control method of exposure during non-selection of gate lines, the gate drive signals {Vgcl(1), ..., Vgcl(M)} are sequentially supplied to all the gate lines GCL coupled to the photodiodes PD serving as the detection targets, and all the photodiodes PD serving as the detection targets are supplied with the reset voltage. Then, after all the gate lines GCL coupled to the photodiode PD serving as the detection targets are set to a low voltage (the first switching elements Tr are turned off), the exposure starts and the exposure is performed during the exposure period Pex. After the exposure ends, the gate drive signals {Vgcl(1), ..., Vgcl(M)} are sequentially supplied to the gate lines GCL coupled to the photodiode PD serving as the detection targets as described above, and reading is performed during the reading period Pdet. In the full-time control method of exposure, control for performing the exposure can also be performed during the reset period Prst and the reading period Pdet (full-time exposure control). In this case, the exposure period Pex(1) starts after the gate drive signal Vgcl(1) is supplied to the gate line GCL during the reset period Prst. The term "exposure period Pex {(1), ..., (M)}" refers to a period during which the capacitive elements Ca are charged from the photodiodes PD. The electric charge stored in the capacitive element Ca during the reset period Prst causes a reverse directional current (from cathode to anode) to flow through the photodiode PD due to light irradiation, and the potential difference in the capacitive element Ca decreases. The start timing and the end timing of the actual exposure periods Pex(1), ..., Pex(M) are different among the partial detection areas PAA corresponding to the gate lines GCL. The "actual exposure period" is not a period during which the light source emits light but a period during which the electric charges corresponding to the light received by the photodiodes PD are stored in the respective capacitive elements Ca in the lighting period of the light source. Each of the exposure periods Pex(1), ..., Pex(M) starts when the gate drive signal Vgcl changes from the power supply voltage VDD serving as the high-level voltage to the power supply voltage VSS serving as the low-level voltage during the reset period Prst. Each of the exposure periods Pex(1), ..., Pex(M) ends when the gate drive signal Vgcl changes from the power supply voltage VSS to the power supply voltage VDD during the reading period Pdet. The lengths of the exposure time of the exposure periods Pex(1), ..., Pex(M) are equal.

In the control method of exposure during non-selection of gate lines, a current flows correspondingly to the light irradiating the photodiode PD in each of the partial detection areas PAA during the exposure periods Pex {(1) ... (M)}. As a result, an electric charge is stored in each of the capacitive elements Ca.

At a time before the reading period Pdet starts, the control circuit 122 sets the reset signal RST2 to a low-level voltage. This operation stops operation of the reset circuit 17. The reset signal may be set to a high-level voltage only during the reset period Prst. During the reading period Pdet, the gate line drive circuit 15 sequentially supplies the gate drive signals Vgcl(1), ..., Vgcl(M) to the gate lines GCL in the same manner as during the reset period Prst.

Figure 8:
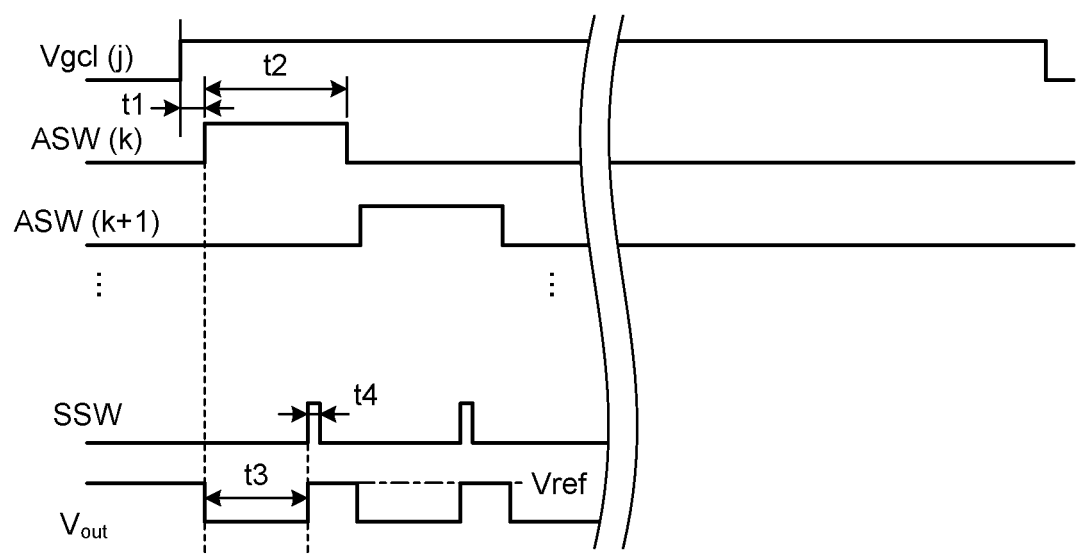
FIG. 8 is a timing waveform diagram illustrating an operation example during a reading period in FIG. 7.

Specifically, as illustrated in FIG. 8, the gate line drive circuit 15 supplies the gate drive signal Vgcl(1) at the high-level voltage (power supply voltage VDD) to the gate line GCL(1) during a row reading period VR(1). The control circuit 122 sequentially supplies selection signals ASW1, ..., ASW6 to the signal line selection circuit 16 during a period in which the gate drive signal Vgcl(1) is at the high-level voltage (power supply voltage VDD). This operation sequentially or simultaneously couples the signal lines SGL of the partial detection areas PAA selected by the gate drive signal Vgcl(1) to the detection circuit 48. As a result, the detection signal Vdet for each of the partial detection areas PAA is supplied to the detection circuit 48.

In the same manner, the gate line drive circuit 15 supplies the gate drive signals Vgcl(2), ..., Vgcl(M-1), Vgcl(M) at the high-level voltage to the gate lines GCL(2), ..., GCL(M-1), GCL(M) during row reading periods VR(2), ..., VR(M-1), VR(M), respectively. That is, the gate line drive circuit 15 supplies the gate drive signal Vgcl to the gate line GCL during each of the row reading periods VR(1), VR(2), ..., VR(M-1), VR(M). The signal line selection circuit 16 sequentially selects each of the signal lines SGL based on the selection signal ASW in each period in which the gate drive signal Vgcl is set to the high-level voltage. The signal line selection circuit 16 sequentially couples each of the signal lines SGL to one detection circuit 48. Thus, the detection device 1 can output the detection signals Vdet of all the partial detection areas PAA to the detection circuit 48 during the reading period Pdet.

FIG. 8 is a timing waveform diagram illustrating an operation example during the reading period in FIG. 7. With reference to FIG. 8, the following describes the operation example during the row reading period VR that is a supply period of one of the gate drive signals Vgcl(j) in FIG. 7. In FIG. 7, the reference sign of the row reading period VR is assigned to the first gate drive signal Vgcl(1). The same applies to the other gate drive signals Vgcl(2), ..., Vgcl(M). The index j is any one of the natural numbers 1 to M.

As illustrated in FIGS. 8 and 4, an output ($V_{out}$) of each of the third switching elements TrS has been reset to the reference potential (Vref) voltage in advance. The reference potential (Vref) serves as the reset voltage, and is set to, for example, 0.75 V. Then, the gate drive signal Vgcl(j) is set to a high level, and the first switching elements Tr of a corresponding row are turned on. Thus, each of the signal lines SGL in each row is set to a voltage corresponding to the electric charge stored in the capacity (capacitive element Ca) of the partial detection area PAA. After a period t1 elapses from a rising edge of the gate drive signal Vgcl(j), a period t2 starts in which the selection signal ASW(k) is set to a high level. After the selection signal ASW(k) is set to the high level and the third switching element TrS is turned on, the electric charge stored in the capacity (capacitive element Ca) of the partial detection area PAA coupled to the detection circuit 48 through the third switching element TrS changes the output ($V_{out}$) of the third switching element TrS (refer to FIG. 4) to a voltage corresponding to the electric charge stored in the capacity (capacitive element Ca) of the partial detection area PAA (period t3). In the example of FIG. 8, this voltage is reduced from the reset voltage as illustrated in the period t3. Then, after the switch SSW is turned on (period t4 during which an SSW signal is set to a high level), the electric charge stored in the capacity (capacitive element Ca) of the partial detection area PAA moves to the capacity (capacitive element Cb) of the detection signal amplifier 42 of the detection circuit 48, and the output voltage of the detection signal amplifier 42 is set to a voltage corresponding to the electric charge stored in the capacitive element Cb. At this time, the potential of the inverting input portion of the detection signal amplifier 42 is set to an imaginary short-circuit potential of an operational amplifier, and therefore, returns to the reference potential (Vref). The A/D converter 43 reads the output voltage of the detection signal amplifier 42. In the example of FIG. 8, waveforms of the selection signals ASW(k), ASW(k+1), ... corresponding to the signal lines SGL of the respective columns are set to a high level to sequentially turn on the third switching elements TrS, and the same operation is sequentially performed. This operation sequentially reads the electric charges stored in the capacities (capacitive elements Ca) of the partial detection areas PAA coupled to the gate line GCL. ASW(k), ASW(k+1), . . . in FIG. 8 are, for example, any of ASW1 to ASW6 in FIG. 7.

Specifically, after the period t4 starts in which the switch SSW is on, the electric charge moves from the capacity (capacitive element Ca) of the partial detection area PAA to the capacity (capacitive element Cb) of the detection signal amplifier 42 of the detection circuit 48. At this time, the non-inverting input (+) of the detection signal amplifier 42 is supplied with the reference potential (Vref) voltage (for example, 0.75 V). As a result, the output ($V_{out}$) of the third switching element TrS is also set to the reference potential (Vref) voltage due to the imaginary short-circuit between input ends of the detection signal amplifier 42. The voltage of the capacitive element Cb is set to a voltage corresponding to the electric charge stored in the capacity (capacitive element Ca) of the partial detection area PAA at a location where the third switching element TrS is turned on in response to the selection signal ASW(k). After the output ($V_{out}$) of the third switching element TrS is set to the reference potential (Vref) voltage due to the imaginary short-circuit, the output of the detection signal amplifier 42 reaches a voltage corresponding to the capacitance of the capacitive element Cb, and this output voltage is read by the A/D converter 43. The voltage of the capacitive element Cb is, for example, a voltage between two electrodes provided on a capacitor constituting the capacitive element Cb.

The period t1 is, for example, 20 μs. The period t2 is, for example, 60 μs. The period t3 is, for example, 44.7 μs. The period t4 is, for example, 0.98 μs.

Although FIGS. 7 and 8 illustrate the example in which the gate line drive circuit 15 individually selects the gate line GCL, the present disclosure is not limited to this example. The gate line drive circuit 15 may simultaneously select a predetermined number (two or more) of the gate lines GCL, and sequentially supply the gate drive signals Vgcl to the gate lines GCL in units of the predetermined number of the gate lines GCL. The signal line selection circuit 16 may also simultaneously couple a predetermined number (two or more) of the signal lines SGL to one detection circuit 48. Moreover, the gate line drive circuit 15 may skip some of the gate lines GCL and scan the remaining ones.

Figure 9:
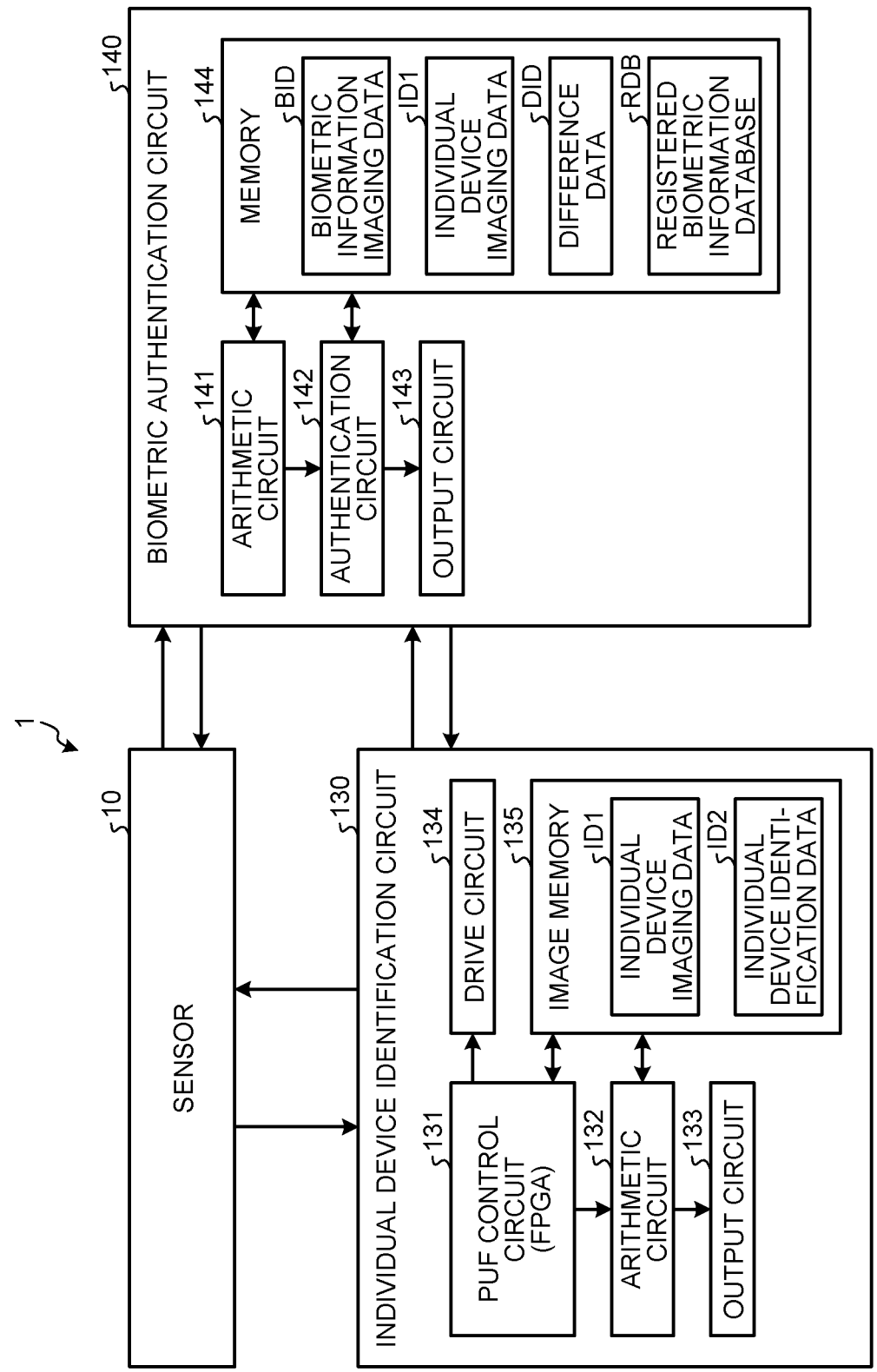
FIG. 9 is a block diagram illustrating a configuration example of an individual device identification circuit and a biometric authentication circuit of the detection device according to the first embodiment.

The following describes an individual device identification method and a biometric authentication method of the detection device 1. FIG. 9 is a block diagram illustrating a configuration example of an individual device identification circuit and a biometric authentication circuit of the detection device according to the first embodiment.

As illustrated in FIG. 9, the detection device 1 includes an individual device identification circuit 130 and a biometric authentication circuit 140. The individual device identification circuit 130 is a circuit that identifies the individual detection device 1 (sensor 10) based on individual device imaging data ID1 (first imaging data) when the first light sources 61 are off (unlit). The individual device identification circuit 130 performs individual device identification using a physical unclonable function (hereinafter denoted as PUF) that is a unique characteristic distribution of the photodiodes PD included in the sensor 10. The biometric authentication circuit 140 is a circuit that receives biometric information imaging data BID from the sensor 10 and performs personal authentication.

The individual device identification circuit 130 and the biometric authentication circuit 140 may be provided in any manner, such as by being included in the control circuit 122 illustrated in FIG. 1, or by being included in a host IC. The biometric authentication circuit 140 may be provided in an external server, and PUF data and personal information are stored therein so as to be associated with each other.

The individual device identification circuit 130 includes a PUF control circuit 131, an arithmetic circuit 132, an output circuit 133, a drive circuit 134, and an image memory 135. The PUF control circuit 131 is a circuit that controls the individual device identification of the detection device 1. The PUF control circuit 131 is, for example, an FPGA. The PUF control circuit 131 obtains individual device identification data ID2 based on the characteristic distribution of the photodiodes PD, and stores the individual device identification data ID2 in the image memory 135 as reference data during manufacturing or before shipment of the detection device 1. The individual device identification data ID2 is, for example, information on reverse bias currents of the photodiodes PD.

The PUF control circuit 131 acquires the individual device imaging data ID1 based on the detection signals Vdet of the respective photodiodes PD at predetermined timing, such as when the power of the detection device 1 is turned on. For example, the PUF control circuit 131 controls the gate line drive circuit 15 and the signal line selection circuit 16 (refer to FIG. 1) to scan the photodiodes PD in the sensor 10. The drive circuit 134 supplies the sensor power supply signal VDDSNS (refer to FIG. 4) causing a reverse bias drive to the photodiode PD in the sensor 10 based on a control signal from the PUF control circuit 131. As an example, as described above, in the reverse bias drive, the first switching element Tr and the fourth switching element TrR are turned on, and, for example, the reference signal COM at substantially 0.75 V is supplied to the cathode of the photodiode PD, and the sensor power supply signal VDDSNS at substantially −1.25 V is supplied to the anode of the photodiode PD. The imaging data is also acquired by reading the electric charge of the capacitive element Ca, as described above. Thus, the PUF control circuit 131 acquires the individual device imaging data ID1 and stores the individual device imaging data ID1 in the image memory 135. Various types of imaging data, such as the individual device imaging data ID1, are a set of information items in which the detection signals Vdet of the respective photodiodes PD are arranged in a predetermined order.

The arithmetic circuit 132 compares the individual device imaging data ID1 with the individual device identification data ID2 serving as the reference data to perform the individual device identification of the detection device 1. The arithmetic circuit 132 determines whether the detection signals Vdet (reverse bias currents) of the respective photodiodes PD match the reference data (individual device identification data ID2). If the matching ratio between the detection signals Vdet (reverse bias currents) of the respective photodiodes PD and the individual device identification data ID2 of the photodiodes PD stored in advance is 99% or larger, the arithmetic circuit 132 determines that the individual device imaging data ID1 is data imaged by the detection device 1. If the matching ratio between the detection signals Vdet (reverse bias currents) of the respective photodiodes PD and the individual device identification data ID2 is smaller than 99%, the arithmetic circuit 132 determines that the individual device identification has failed.

The output circuit 133 is a circuit that outputs the determination result of the arithmetic circuit 132 to the control circuit 122 (refer to FIG. 1) and the biometric authentication circuit 140. Alternatively, the output circuit 133 may output the determination result to an external display (not illustrated) to make it display the result of the individual device identification. The output circuit 133 outputs the acquired individual device imaging data ID1 together with the determination result to the biometric authentication circuit 140.

The biometric authentication circuit 140 includes an arithmetic circuit 141, an authentication circuit 142, an output circuit 143, and a memory 144. The memory 144 stores therein various types of information including, for example, the biometric information imaging data BID, the individual device imaging data ID1, difference data DID, and a registered biometric information database RDB.

The biometric information imaging data BID is imaging data acquired based on the detection signals Vdet output from the photodiodes PD in the sensor 10. The individual device imaging data ID1 is information on the PUF obtained by the individual device identification circuit 130 and transmitted to the biometric authentication circuit 140. The difference data DID is data of differences between the biometric information imaging data BID and the individual device imaging data ID1. That is, the difference data DID is data obtained by removing the unique characteristic distribution of the photodiodes PD from the biometric information imaging data BID that is the acquired raw data. The registered biometric information database RDB includes a plurality of items of registered biometric information that has been registered in advance for each user of the detection device 1. The registered biometric information database RDB may include a plurality of types of biometric information, such as a fingerprint and a vein pattern, about one user.

The arithmetic circuit 141 generates the difference data DID by calculating the difference between the difference data DID acquired from the sensor 10 and the individual device imaging data ID1 acquired from the individual device identification circuit 130. The arithmetic circuit 141 stores the difference data DID in the memory 144.

The authentication circuit 142 performs the personal authentication by comparing the difference data DID with the registered biometric information on the user acquired from the registered biometric information database RDB. The output circuit 143 transmits the authentication result to an external device coupled to the detection device 1. The external device performs a predetermined operation corresponding to the authentication result. If the personal authentication does not result in matching, the detection device 1 may display the result of the authentication mismatch on the display and request the user to try the authentication again.

Figure 10:
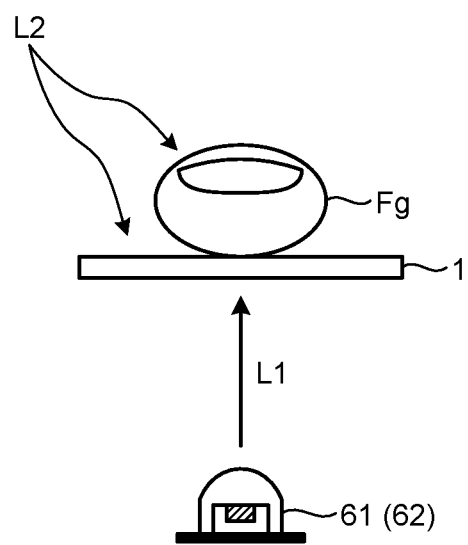
FIG. 10 is an explanatory diagram schematically illustrating a relation between the detection device and a light source.
Figure 11:
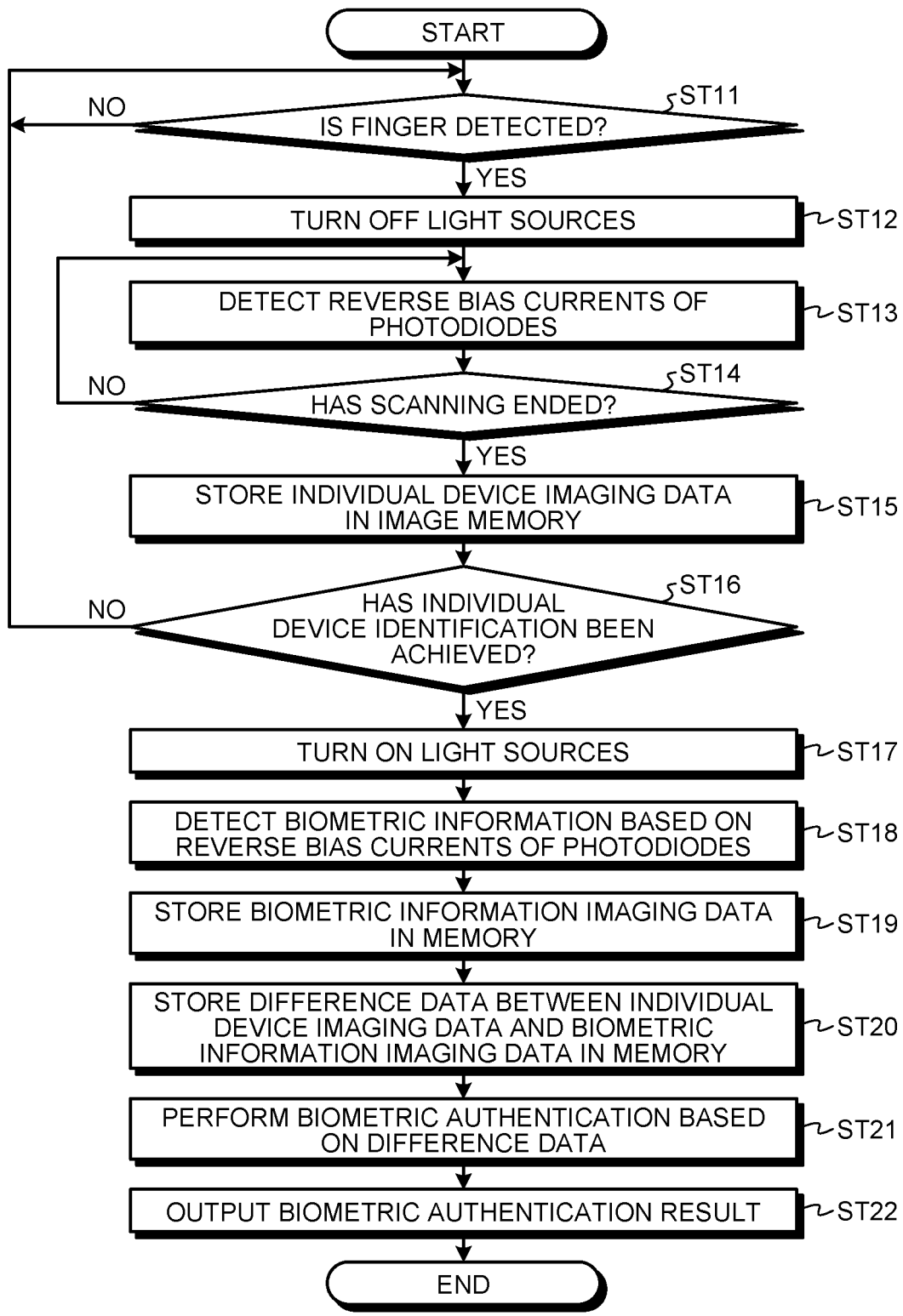
FIG. 11 is a flowchart for explaining an operation example of the detection device according to the first embodiment.

The following describes the individual device identification method and the biometric authentication method of the detection device 1 with reference to FIGS. 9 to 11. FIG. 10 is an explanatory diagram schematically illustrating a relation between the detection device and the light sources. FIG. 11 is a flowchart for explaining an operation example of the detection device according to the first embodiment.

As illustrated in FIG. 10, the first light sources 61 (or the second light sources 62) are arranged below the detection device 1. The finger Fg serving as the object to be detected is disposed above/on the detection device 1. More specifically, the first light sources 61 are arranged so as to face the sensor base member 21 (refer to FIG. 5), and the finger Fg is disposed so as to face the photodiodes PD (refer to FIG. 5). Thus, the sensor base member 21 (substrate) and the photodiodes PD of the detection device 1 are located between the first light sources 61 and the finger Fg serving as the object to be detected.

In the present embodiment, when the first light sources 61 are turned on (lit up) in a state where the finger Fg is disposed above/on the detection device 1, the light L1 is reflected by the surface of the finger Fg. The light reflected by the finger Fg irradiates the photodiodes PD, and the detection device 1 can detect the biometric information. When the first light sources 61 are turned off (unlit) in a state where the finger Fg is disposed above/on the detection device 1, the light L1 is not emitted, and the photodiodes PD of the detection device 1 are shielded from light by the finger Fg, thus, being capable of restraining external light L2 from irradiating the photodiodes PD.

As illustrated in FIG. 11, the detection device 1 performs an individual device identification process (from Step ST11 to Step ST16), and then, performs a biometric authentication process (from Step ST17 to Step ST22). The individual device identification process need not be performed for each biometric authentication process, and may be performed at predetermined timing, such as when the power of the detection device 1 is turned on, as described above.

First, the PUF control circuit 131 determines, based on the detection signal Vdet from the sensor 10, whether the finger Fg is detected (Step ST11). If finger Fg is not detected (No at Step ST11), the PUF control circuit 131 stops the individual device identification process until the finger Fg is detected. At this time, the detection device 1 may, for example, display a prompt to the user to bring the finger Fg into contact with the sensor 10.

If the finger Fg is detected (Yes at Step ST11), the PUF control circuit 131 turns off the first light sources 61 (to an unlit state) (Step ST12). As a result, the photodiodes PD in the sensor 10 are covered with the finger Fg to be shielded from light. The PUF control circuit 131 may control the operation of, for example, the sensor 10 and the first light sources 61 through the control circuit 122 illustrated in FIG. 1. If the PUF control circuit 131 is integrated with the control circuit 122, the PUF control circuit 131 may directly control the operation of, for example, the sensor 10 and the first light sources 61.

The PUF control circuit 131 drives the photodiodes PD in the sensor 10 as described above, and the detection circuit 48 detects the detection signals Vdet (first detection signals) based on the reverse bias currents of the photodiodes PD in a state where the first light sources 61 are off (unlit) (Step ST13).

The PUF control circuit 131 determines whether the scanning of the photodiodes PD has ended (Step ST14). If the scanning has not ended (No at Step ST14), the PUF control circuit 131 causes the gate line drive circuit 15 to sequentially drive the gate lines GCL. The operation to obtain the first detection signals at Step ST13 and Step ST14 is the same driving operation as that in the reset period Prst, the exposure period Pex, and the reading period Pdet illustrated in FIGS. 7 and 8 explained above, and the repetitive explanation thereof will be omitted.

If the scanning has ended (Yes at Step ST14), the PUF control circuit 131 stores the imaging data based on the detection signals Vdet as the individual device imaging data ID1 (first imaging data) in the image memory 135 (Step ST15). The individual device imaging data ID1 is the information based on the reverse bias currents of the photodiodes PD when the first light sources 61 are off (unlit), as described above, and is obtained as the PUF that reflects the unique characteristic distribution of the photodiodes PD. As this "unique characteristic distribution", unique distribution data not affected by the external light or the like can be obtained by using the PUF data acquired when the power is off as the difference data between the maximum value and the minimum value among the acquired data.

The PUF control circuit 131 performs the individual device identification (Step ST16). The arithmetic circuit 132 compares the individual device imaging data ID1 with the individual device identification data ID2 stored in advance as the reference data. The arithmetic circuit 132 compares the matching ratio of the values of the detection signals Vdet (reverse bias currents) of the respective photodiodes PD. If the individual device identification has failed (No at Step ST16), that is, the matching ratio is lower than a reference value, the PUF control circuit 131 performs the individual device identification again. Alternatively, the PUF control circuit 131 displays information indicating that the individual device identification has failed on the display.

If the individual device identification has been achieved (Yes at Step ST16), that is, if the matching ratio is equal to or higher than the reference value, the output circuit 133 outputs the determination result of the individual device identification to the control circuit 122 and the biometric authentication circuit 140. The output circuit 133 also outputs the individual device imaging data ID1 obtained in the individual device identification process to the biometric authentication circuit 140. The biometric authentication circuit 140 stores the individual device imaging data ID1 in the memory 144.

The method of the individual device identification is not limited to the method of comparing the reverse bias currents of the respective photodiodes PD. For example, the individual device identification circuit 130 may acquire the individual device imaging data ID1 and the individual device identification data ID2 as respective pieces of image data, and compare them using pattern matching.

The control circuit 122 supplies a control signal to the biometric authentication circuit 140 to perform the biometric authentication process starting at Step ST17. The control circuit 122 turns on (lights up) the first light sources 61 (Step ST17).

The control circuit 122 drives the photodiodes PD in the sensor 10, and the detection circuit 48 detects the detection signals Vdet (second detection signals) based on the reverse bias currents of the photodiodes PD in a state where the first light sources 61 are on (lit up) (Step ST18). The operation to obtain the detection signals Vdet (second detection signals) at Step ST18 is the same driving operation as that in the reset period Prst, the exposure period Pex, and the reading period Pdet illustrated in FIGS. 7 and 8 explained above, and the repetitive explanation thereof will be omitted.

After the scanning of the photodiodes PD ends, the biometric authentication circuit 140 stores, in the memory 144, the biometric information imaging data BID (second imaging data) based on the detection signals Vdet (second detection signals) obtained at Step ST18 (Step ST19). At this time, the biometric authentication circuit 140 stores the biometric information imaging data BID in the memory 144 such that the biometric information imaging data BID is associated with the individual device imaging data ID1 obtained from Step ST11 to Step ST16.

The arithmetic circuit 132 calculates the difference between the biometric information imaging data BID and the individual device imaging data ID1 to generate the difference data DID. The arithmetic circuit 132 stores the difference data DID in the memory 144 (Step ST20).

The authentication circuit 142 performs the biometric authentication based on the difference data DID (Step ST21). That is, the authentication circuit 142 compares the difference data DID with the biometric information on the user registered in the registered biometric information database RDB to determine whether the matching ratio is equal to or higher than the reference value. Also at Step ST21, the detection signals Vdet of the respective photodiodes PD may be compared, or the pattern matching of the image data may be performed, as described above.

The output circuit 143 outputs the biometric authentication result received from the authentication circuit 142 to the control circuit 122 (Step ST22). If the control circuit 122 verifies the identity of the user based on the authentication result, the control circuit 122 executes predetermined processing (for example, grants access to equipment on which the detection device 1 is mounted).

For ease of understanding of the description, FIG. 9 separately illustrates the individual device identification circuit 130 and the biometric authentication circuit 140. However, the individual device identification circuit 130 and the biometric authentication circuit 140 are not limited to this illustration, and may be implemented as one IC. In this case, the arithmetic circuit 132 and the arithmetic circuit 141 may be implemented as one circuit, and the image memory 135 and the memory 144 may also be implemented as one memory circuit. The flowchart illustrated in FIG. 11 may also be modified as appropriate.

As described above, in the present embodiment, the individual device identification is performed after the finger Fg is detected. Therefore, the photodiodes PD can be shielded from light by simply turning off the first light sources 61. In the individual device identification process, the detection signals Vdet (first detection signals) based on the reverse bias currents of the photodiodes PD can be detected in a state where the photodiodes PD are shielded from light. In the individual device identification process, the photodiodes PD in the sensor 10 are driven by the same method as that in the biometric authentication process. That is, the individual device identification process and the biometric authentication process can share the circuits such as the gate line drive circuit 15. In addition, the biometric authentication and the acquisition of the PUF data can be efficiently performed by acquiring the reverse bias currents and the individual device imaging data when the power is off.

In the biometric authentication process, the biometric authentication is performed based on the difference data DID. That is, the biometric authentication is performed using information obtained by excluding the unique characteristic distribution of the photodiodes PD. Therefore, detection errors that would be caused by a time-elapsed change or the like in the characteristics of the photodiodes PD can be reduced, so that the detection device 1 can improve the detection accuracy of the biometric authentication.

Second Embodiment

Figure 12:
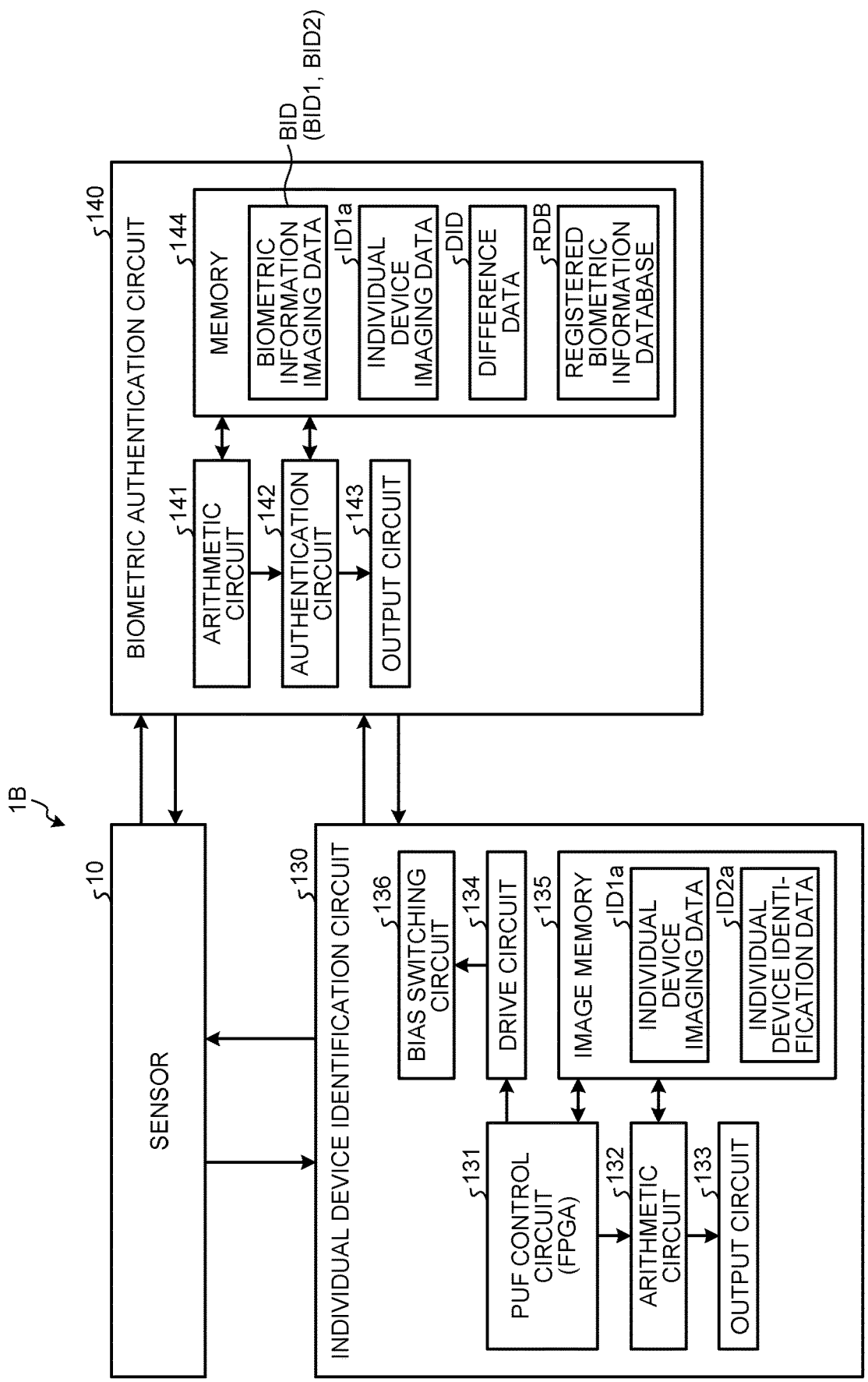
FIG. 12 is a block diagram illustrating a configuration example of an individual device identification circuit and a biometric authentication circuit of a detection device according to a second embodiment.
Figure 13:
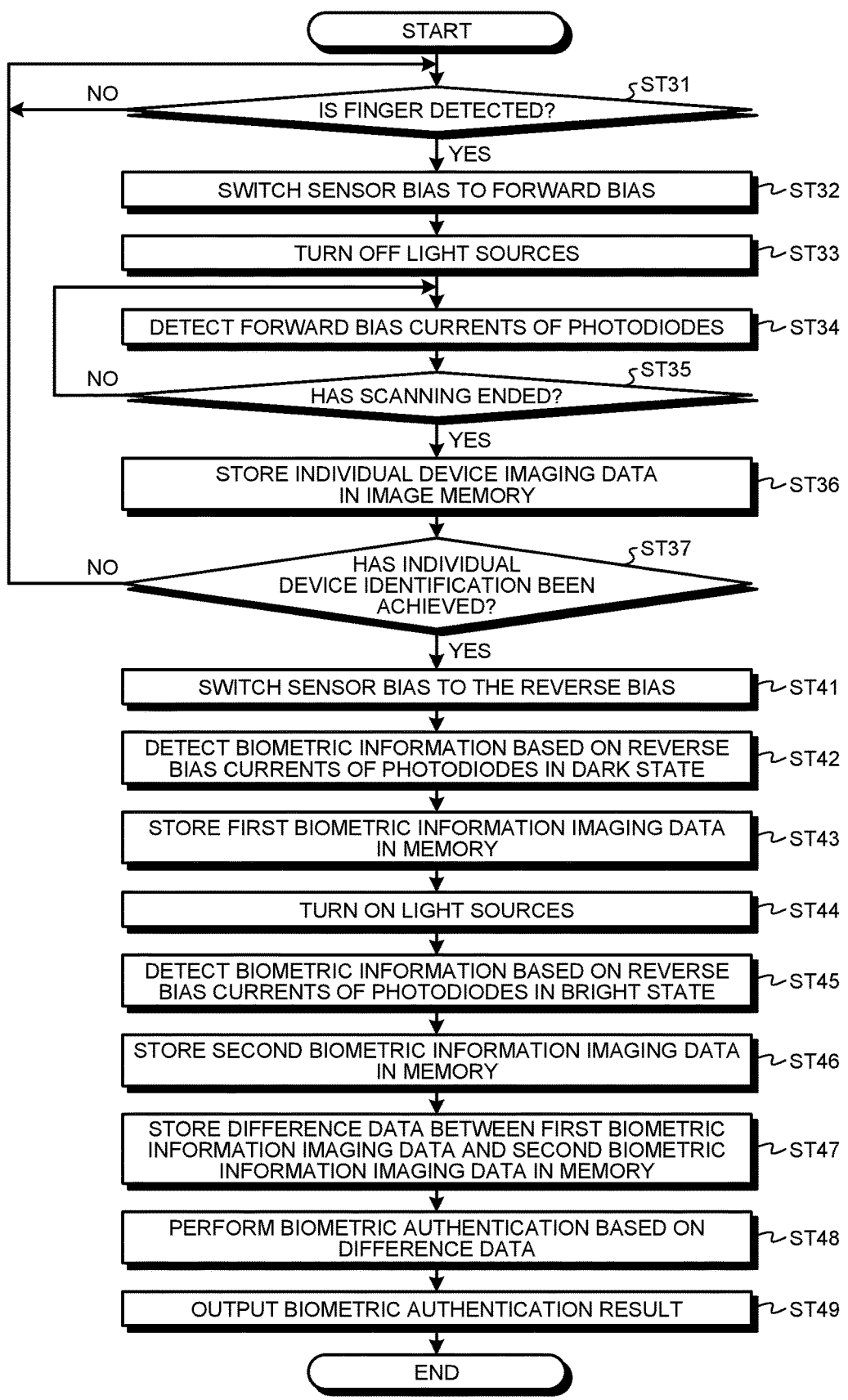
FIG. 13 is a flowchart for explaining an operation example of the detection device according to the second embodiment.

FIG. 12 is a block diagram illustrating a configuration example of an individual device identification circuit and a biometric authentication circuit of a detection device according to a second embodiment. FIG. 13 is a flowchart for explaining an operation example of the detection device according to the second embodiment. In the following description, the same components as those described in the embodiment above are denoted by the same reference numerals, and the description thereof will not be repeated.

As illustrated in FIG. 12, in a detection device 1B according to the second embodiment, the individual device identification circuit 130 includes a bias switching circuit 136. The bias switching circuit 136 is a circuit that switches the drive method of the photodiodes PD between a forward bias drive and the reverse bias drive.

For example, the reference signal COM at substantially 0.75 V is supplied to the cathode of the photodiode PD, and the sensor power supply signal VDDSNS at substantially −1.25 V is supplied to the anode of the photodiode PD. In the forward bias drive, an operation of the bias switching circuit 136 supplies the reference signal COM at substantially 0.75 V to the anode of the photodiode PD and supplies the sensor power supply signal VDDSNS at substantially −1.25 V to the cathode of the photodiode PD. The forward bias drive is not limited to this drive method. The bias switching circuit 136 may cause the forward bias drive so as to supply the reference signal COM at substantially 0.75 V to the cathode of the photodiode PD and supply the sensor power supply signal VDDSNS having a potential higher than 0.75 V to the anode of the photodiode PD.

As illustrated in FIG. 13, first, if a finger Fg is detected (Yes at Step ST31), the PUF control circuit 131 supplies a control signal to the bias switching circuit 136 to switch a sensor bias of the photodiode PD to the forward bias drive (Step ST32).

The PUF control circuit 131 turns off the first light sources 61 (to an unlit state) (Step ST33). The PUF control circuit 131 drives the photodiodes PD in the sensor 10 as described above, and the detection circuit 48 detects the detection signals Vdet (third detection signals) based on forward bias currents of the photodiodes PD in the state where the first light sources 61 are off (unlit) (Step ST34).

If the scanning of the photodiodes PD has ended (Yes at Step ST35), the PUF control circuit 131 stores the imaging data based on the detection signals Vdet as individual device imaging data ID1a (third imaging data) in the image memory 135 (Step ST36). The operation to obtain the detection signals Vdet (third detection signals) based on the forward bias currents at Step ST34 and Step ST35 differs in that the photodiodes PD are driven in the forward bias drive, from the operations in the reset period Prst, the exposure period Pex, and the reading period Pdet illustrated in FIGS. 7 and 8 explained above; but the operations of the other circuits are performed in the same drive method as that in the reset period Prst, the exposure period Pex, and the reading period Pdet illustrated in FIGS. 7 and 8.

Then, the PUF control circuit 131 performs the individual device identification (Step ST37). The arithmetic circuit 132 compares the individual device imaging data ID1a with individual device identification data ID2a stored in advance as the reference data. The individual device identification data ID2a stored as the reference data is obtained in advance based on the forward bias currents of the photodiodes PD.

If the individual device identification has been achieved (Yes at Step ST37), that is, if the matching ratio is equal to or higher than the reference value, the output circuit 133 outputs the determination result of the individual device identification to the control circuit 122 and the biometric authentication circuit 140. The output circuit 133 also outputs the individual device imaging data ID1a obtained by the individual device identification to the biometric authentication circuit 140. The biometric authentication circuit 140 stores the individual device imaging data ID1a in the memory 144.

The individual device imaging data ID1a is the information based on the forward bias currents of the photodiodes PD when the first light sources 61 is off (unlit), as described above, and is obtained as a PUF that reflects the unique characteristic distribution of the photodiodes PD. In addition, since the photodiodes PD are driven in the forward bias drive, errors in the individual device imaging data ID1a that would be caused by the external light L2 can be reduced.

Then, the control circuit 122 supplies a control signal to the biometric authentication circuit 140 to perform the biometric authentication process starting at Step ST41. First, the control circuit 122 supplies a control signal to the PUF control circuit 131 to cause the bias switching circuit 136 to switch the sensor bias of the photodiode PD to the reverse bias drive (step ST41).

The control circuit 122 drives the photodiodes PD in the sensor 10 to detect the detection signals Vdet (first detection signals) based on the reverse bias currents of the photodiodes PD in the state where the first light sources 61 are off (unlit) (Step ST42). The operation to obtain the first detection signals at Step ST42 differs in that the operation is performed in a dark state, that is, the state where the first light sources 61 are off (unlit), from the driving in the reset period Prst, the exposure period Pex, and the reading period Pdet illustrated in FIGS. 7 and 8 explained above; but the driving of the other circuits is the same as the driving in the reset period Prst, the exposure period Pex, and the reading period Pdet illustrated in FIGS. 7 and 8. Thus, the repetitive explanation thereof will be omitted.

After the scanning of the photodiodes PD ends, the biometric authentication circuit 140 stores first biometric information imaging data BID1 based on the detection signals Vdet (first detection signals) obtained at Step ST42 in the memory 144 (Step ST43). At this time, the biometric authentication circuit 140 stores the first biometric information imaging data BID11 and second biometric information imaging data BID2 (described later) such that the first biometric information imaging data BID11 and second biometric information imaging data BID2 are associated with the individual device imaging data ID1a obtained at Step ST31 to Step ST37.

Then, the control circuit 122 turns on (lights up) the first light sources 61 (Step ST44). The control circuit 122 drives the photodiodes PD in the sensor 10 to detect the detection signals Vdet (second detection signals) based on the reverse bias currents of the photodiodes PD in the state where the first light sources 61 are on (lit up) (Step ST45). The operation to obtain the second detection signals at Step ST44 is the same as the driving in the reset period Prst, the exposure period Pex, and the reading period Pdet illustrated in FIGS. 7 and 8 explained above, and the repetitive explanation thereof will be omitted.

After the scanning of the photodiodes PD ends, the biometric authentication circuit 140 stores the second biometric information imaging data BID2 based on the detection signals Vdet (second detection signals) obtained at Step ST45 in the memory 144 (Step ST46).

The arithmetic circuit 132 calculates the difference between the first biometric information imaging data BID1 and the second biometric information imaging data BID2 to generate the difference data DID (BID2−BID1). The arithmetic circuit 132 stores the difference data DID in the memory 144 (Step ST47).

The authentication circuit 142 performs the biometric authentication based on the difference data DID (Step ST48). Also at Step ST48, the detection signals Vdet of the respective photodiodes PD may be compared, or the pattern matching of the image data may be performed, as described above.

The output circuit 143 outputs the biometric authentication result received from the authentication circuit 142 to the control circuit 122 (Step ST49).

In the present embodiment, in the individual device identification process, the photodiodes PD are driven by the forward bias drive that is less affected by the external light L2. Therefore, the accuracy of the individual device identification is improved. In addition, the biometric authentication and the acquisition of the PUF data can be efficiently performed by acquiring the forward bias currents and the individual device imaging data when the power is off.

In the biometric authentication process, the first biometric information imaging data BID1 and the second biometric information imaging data BID2 are acquired both when the first light sources 61 are off (unlit) and when they are on (lit up). The first biometric information imaging data BID1 is information based on the unique characteristic distribution of the photodiodes PD, and the biometric authentication is performed using the difference data DID obtained by excluding the first biometric information imaging data BID1. Therefore, the detection errors that would be caused by a time-elapsed change or the like in the characteristics of the photodiodes PD can be reduced, so that the detection accuracy of the biometric authentication can be improved.

The individual device identification process of the first embodiment can be combined with the individual device identification process of the second embodiment. That is, the individual device identification circuit 130 may perform the individual device identification process indicated by Step ST31 to Step ST37 illustrated in FIG. 13 in addition to the individual device identification process indicated by Step ST11 to Step ST17 illustrated in FIG. 11.

That is, the individual device identification circuit 130 identifies the individual device based on the individual device imaging data ID1 (first imaging data) and the individual device imaging data ID1a (third imaging data) when the first light sources 61 are off. The individual device identification circuit 130 determines that matching of the device is achieved in a case where the matching ratio between the individual device imaging data ID1 (first imaging data) when the first light sources 61 are off and the individual device identification data ID2 (reference data) of the photodiodes PD stored in advance is 90% or larger and the matching ratio between the individual device imaging data ID1a (third imaging data) and the individual device identification data ID2a (reference data) of the photodiodes PD is 90% or larger.

While the preferred embodiments of the present disclosure have been described above, the present disclosure is not limited to the embodiments described above. The content disclosed in the embodiments is merely an example, and can be variously modified within the scope not departing from the gist of the present disclosure. Any modifications appropriately made within the scope not departing from the gist of the present disclosure also naturally belong to the technical scope of the present disclosure. At least one of various omissions, substitutions, and changes of the components can be made without departing from the gist of the embodiments and the modification described above.

What is claimed is:

1. A detection device comprising:
    a substrate;
    a plurality of photodiodes arranged on the substrate;
    a light source configured to emit light to an object to be detected;
    a detection circuit configured to detect first detection signals based on reverse bias currents of the photodiodes when the light source is off, and to detect second detection signals based on the reverse bias currents of the photodiodes when the light source is on;
    a memory configured to store first imaging data based on the first detection signals when the light source is off, second imaging data based on the second detection signals when the light source is on, and difference data between the first imaging data and the second imaging data; and
    an individual device identification circuit configured to identify an individual device based on the first imaging data when the light source is off.

2. The detection device according to claim 1, wherein the substrate and the photodiodes are located between the light source and the object to be detected.

3. The detection device according to claim 1, wherein the individual device identification circuit is configured to determine that matching of the individual device is achieved in a case where a matching ratio between the first imaging data when the light source is off and reference data of the photodiodes stored in advance is 99% or larger.

4. A detection device comprising:
    a substrate;
    a plurality of photodiodes arranged on the substrate;
    a light source configured to emit light to an object to be detected;
    a detection circuit configured to detect first detection signals based on reverse bias currents of the photodiodes when the light source is off, and to detect second detection signals based on the reverse bias currents of the photodiodes when the light source is on; and
    a memory configured to store first imaging data based on the first detection signals when the light source is off, second imaging data based on the second detection signals when the light source is on, and difference data between the first imaging data and the second imaging data, wherein
    the detection circuit is configured to detect third detection signals based on forward bias currents of the photodiodes, and
    the memory is configured to store third imaging data based on the third detection signals.

5. The detection device according to claim 4, further comprising an individual device identification circuit configured to identify an individual device based on the first imaging data when the light source is off and the third imaging data, wherein
    the individual device identification circuit is configured to determine that matching of the individual device is achieved when a matching ratio between the first imaging data when the light source is off and reference data of the photodiodes stored in advance is 90% or larger and a matching ratio between the third imaging data and the reference data of the photodiodes is 90% or larger.

6. A detection device comprising:
    a substrate;
    a plurality of photodiodes arranged on the substrate;
    a light source configured to emit light to an object to be detected;
    a detection circuit configured to detect first detection signals based on reverse bias currents of the photodiodes when the light source is off, detect second detection signals based on the reverse bias currents of the photodiodes when the light source is on, and detect third detection signals based on forward bias currents of the photodiodes when the light source is off;

an individual device identification circuit configured to identify an individual device based on individual device imaging data based on the third detection signals; and a memory configured to store first biometric information imaging data based on the first detection signals when the light source is off, second biometric information imaging data based on the second detection signals when the light source is on, and difference data between the first biometric information imaging data and the second biometric information imaging data.

7. A detection device comprising:

a substrate;

a plurality of photodiodes arranged on the substrate; and a light source configured to emit light to an object to be detected, wherein imaging signals based on reverse bias currents of the photodiodes are detected when the light source is on, identification signals based on forward bias currents of the photodiodes are detected when the light source is on or off, and an individual device is identified based on the identification signals.

8. The detection device according to claim 7, further comprising a memory configured to store biometric information imaging data based on the imaging signals and individual identification data based on the identification signals.

* * * * *